United States Patent
Levine et al.

(10) Patent No.: US 11,663,205 B2
(45) Date of Patent: May 30, 2023

(54) TECHNOLOGIES FOR ASYNCHRONOUS QUERYING

(71) Applicant: salesforce.com, Inc., San Francisco, CA (US)

(72) Inventors: Eli Levine, San Francisco, CA (US); Samarpan Jain, Fremont, CA (US); James Ferguson, San Francisco, CA (US); Jan Asita Fernando, San Francisco, CA (US); Bharadwaj Tanikella, San Francisco, CA (US); Saikiran Perumala, San Francisco, CA (US); Cody Marcel, San Francisco, CA (US)

(73) Assignee: SALESFORCE, INC., San Francisco, CA (US)

( * ) Notice: Subject to any disclaimer, the term of this patent is extended or adjusted under 35 U.S.C. 154(b) by 201 days.

(21) Appl. No.: 15/586,714

(22) Filed: May 4, 2017

(65) Prior Publication Data

US 2018/0322168 A1   Nov. 8, 2018

(51) Int. Cl.
   *G06F 16/242*      (2019.01)
   *G06F 16/25*       (2019.01)
   *G06F 16/2458*     (2019.01)

(52) U.S. Cl.
   CPC ...... *G06F 16/2448* (2019.01); *G06F 16/2471* (2019.01); *G06F 16/252* (2019.01); *G06F 16/256* (2019.01)

(58) Field of Classification Search
   CPC ............... G06F 16/2448; G06F 16/256; G06F 16/2471; G06F 16/252; G06F 16/289; G06F 16/20
   See application file for complete search history.

(56) References Cited

U.S. PATENT DOCUMENTS 5,577,188 A   11/1996   Zhu
5,608,872 A   3/1997    Schwartz et al.
(Continued)

FOREIGN PATENT DOCUMENTS

EP      3229151        10/2017
WO      2018/064375    5/2018

OTHER PUBLICATIONS

Atorman, Using Asynchronous SOQL with Event Monitoring, Jan. 5, 2016, pp. 1-3. (Year: 2016).*
(Continued)

*Primary Examiner* — Amresh Singh
*Assistant Examiner* — Fatima P Mina
(74) *Attorney, Agent, or Firm* — Schwabe Williamson & Wyatt

(57) ABSTRACT

Systems, methods, and computer-readable media for asynchronous (async) querying are described. In embodiments, a system may convert a user-issued query into a distributed execution instruction set (DEIS), and issue the DEIS to data stores that may have various database structures. The system may obtain database objects from the data stores, and store a result set indicating the obtained database objects in a location specified by the user-issued query. The system may also provide mechanisms to allow users to view progress of their async query jobs and/or cancel ongoing async query jobs. Other embodiments may be described and/or claimed.

20 Claims, 6 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,704,743 B1 | 3/2004 | Martin |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,757,290 B1 * | 6/2004 | Kalmanek, Jr. ... H04L 29/12377 370/401 |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,996,569 B2 | 3/2015 | Baker et al. |
| 9,031,956 B2 | 5/2015 | Baker et al. |
| 9,495,403 B2 | 11/2016 | Nachnani et al. |
| 9,767,022 B2 | 9/2017 | Pradeep et al. |
| 9,767,040 B2 | 9/2017 | Pradeep et al. |
| 10,037,430 B2 | 7/2018 | Jain et al. |
| 10,178,156 B2 | 1/2019 | Pradeep et al. |
| 10,275,281 B2 | 4/2019 | Pradeep et al. |
| 10,332,129 B2 | 6/2019 | Torman et al. |
| 10,339,126 B2 | 7/2019 | Pradeep et al. |
| 10,380,094 B2 | 8/2019 | Warshavsky |
| 10,452,462 B2 | 10/2019 | Oravivattanakul et al. |
| 10,460,270 B2 | 10/2019 | Jain et al. |
| 10,496,456 B2 | 12/2019 | Pradeep et al. |
| 10,579,691 B2 | 3/2020 | Levine et al. |
| 10,579,692 B2 | 3/2020 | Levine et al. |
| 10,592,474 B2 | 3/2020 | Torman et al. |
| 10,621,207 B2 | 4/2020 | Gray et al. |
| 10,664,455 B2 | 5/2020 | Oravivattanakul et al. |
| 10,664,487 B2 | 5/2020 | Bruce et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |

(56) References Cited

U.S. PATENT DOCUMENTS

| | | |
|---|---|---|
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0259460 A1 | 11/2006 | Zurek |
| 2007/0050191 A1* | 3/2007 | Weider .............. G10L 15/1815 704/E15.04 |
| 2008/0249972 A1 | 10/2008 | Dillon |
| 2008/0281787 A1* | 11/2008 | Arponen ................ G06F 16/24 |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2011/0282864 A1 | 11/2011 | Collins et al. |
| 2011/0282969 A1 | 11/2011 | Iyer |
| 2012/0042218 A1 | 2/2012 | Cinarkaya |
| 2012/0215779 A1* | 8/2012 | Lipstone ............ H04L 65/4084 707/737 |
| 2012/0233137 A1 | 9/2012 | Jakobson et al. |
| 2012/0290407 A1 | 11/2012 | Hubbard et al. |
| 2012/0330924 A1 | 12/2012 | Rajan et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0310232 A1* | 10/2014 | Plattner ............ G06F 16/24552 707/602 |
| 2014/0359537 A1 | 12/2014 | Jackobson et al. |
| 2015/0142846 A1* | 5/2015 | Levine .................... G06F 16/20 707/769 |
| 2015/0149501 A1* | 5/2015 | Prakash ................ G06F 9/5027 707/769 |
| 2015/0169686 A1 | 6/2015 | Elias et al. |
| 2015/0205634 A1* | 7/2015 | McPherson ......... G06F 11/1474 718/102 |
| 2015/0227406 A1* | 8/2015 | Jan ........................ G06F 11/079 714/37 |
| 2015/0237157 A1* | 8/2015 | Wang .................... G06F 16/278 714/4.11 |
| 2015/0379430 A1* | 12/2015 | Dirac .................... G06N 20/00 706/12 |
| 2016/0092502 A1* | 3/2016 | Krishnamurthy ... G06F 16/2428 707/691 |
| 2016/0098472 A1* | 4/2016 | Appleton .............. G06F 9/5066 707/737 |
| 2016/0162546 A1 | 6/2016 | Oh et al. |
| 2016/0292167 A1* | 10/2016 | Tran .................. G06F 16/24542 |
| 2016/0321136 A1* | 11/2016 | Baptist .................... G06F 3/067 |
| 2017/0006135 A1* | 1/2017 | Siebel ...................... H04L 67/02 |
| 2017/0039245 A1 | 2/2017 | Wholey, III |
| 2017/0116274 A1* | 4/2017 | Weissman ......... G06F 16/24544 |
| 2018/0025113 A1 | 1/2018 | Torman |
| 2018/0060400 A1* | 3/2018 | Wu .................. G06F 16/24549 |
| 2018/0096012 A1 | 4/2018 | Warshavsky et al. |
| 2018/0096165 A1 | 4/2018 | Warshavsky et al. |
| 2018/0165309 A1 | 6/2018 | Tajuddin et al. |
| 2018/0322168 A1 | 11/2018 | Levine et al. |
| 2019/0042573 A1 | 2/2019 | Marcel et al. |
| 2019/0057101 A1 | 2/2019 | Esserlieu et al. |
| 2019/0095532 A1 | 3/2019 | Levine et al. |
| 2019/0236198 A1 | 8/2019 | Fernando et al. |
| 2019/0272335 A1 | 9/2019 | Liu et al. |
| 2019/0286832 A1 | 9/2019 | Szeto et al. |
| 2019/0325039 A1 | 10/2019 | Fernando et al. |
| 2020/0073987 A1 | 3/2020 | Perumala et al. |
| 2020/0218702 A1 | 7/2020 | Fernando et al. |
| 2020/0320071 A1 | 10/2020 | Bruce et al. |

OTHER PUBLICATIONS

Freeman et al., "Head first design patterns", O'Reilly Media, Inc., Chapters 2 and 4 (2008).

* cited by examiner

TECHNOLOGIES FOR ASYNCHRONOUS QUERYING

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to database systems, and in particular to systems and methods for querying and storing large amounts of data in various data stores.

BACKGROUND

In multi-tenant database systems, customer organizations (also referred to as "tenants") may share database resources in one logical database. The databases themselves are typically shared, and each tenant is typically associated with an organization identifier (org ID) column or field that may be used to identify rows or records belonging to each tenant. Each tenant may provide their own custom data, which may include defining custom objects and custom fields, as well as designating one or more custom fields to act as custom index fields. Users of a multi-tenant database system (e.g., agents of a particular organization or tenant) may obtain data from an associated tenant space, which may be used to render/display visual representations of relevant tenant data.

As service providers grow (in terms of numbers of customers and/or amount of customer data), data retention and management becomes more complex. With that growth comes the significant challenge of how to effectively and efficiently represent the increased volume of data. Object models and semantics that work at one level may not be effective with this growth. Data retention and management also becomes more complex as the number of data sources feeding into a multi-tenant database system increases. Another layer of complexity may arise when these additional data sources have different database structures/architectures than those typically used by the multi-tenant database system. This complexity can be exacerbated when such database structures/architectures are not built/designed for multi-tenant systems. One aspect of this growth that is difficult to manage is the ability to quickly and effectively search large amounts of data. While the service provider is pushed to provide more suitable storage and/or semantics, customers may want to continue to work within the same data model, platform, and/or data accessibility. It may be difficult for service providers to manage the ability to quickly and effectively search large amounts of data thereby resulting in increased resource overhead and/or user dissatisfaction.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
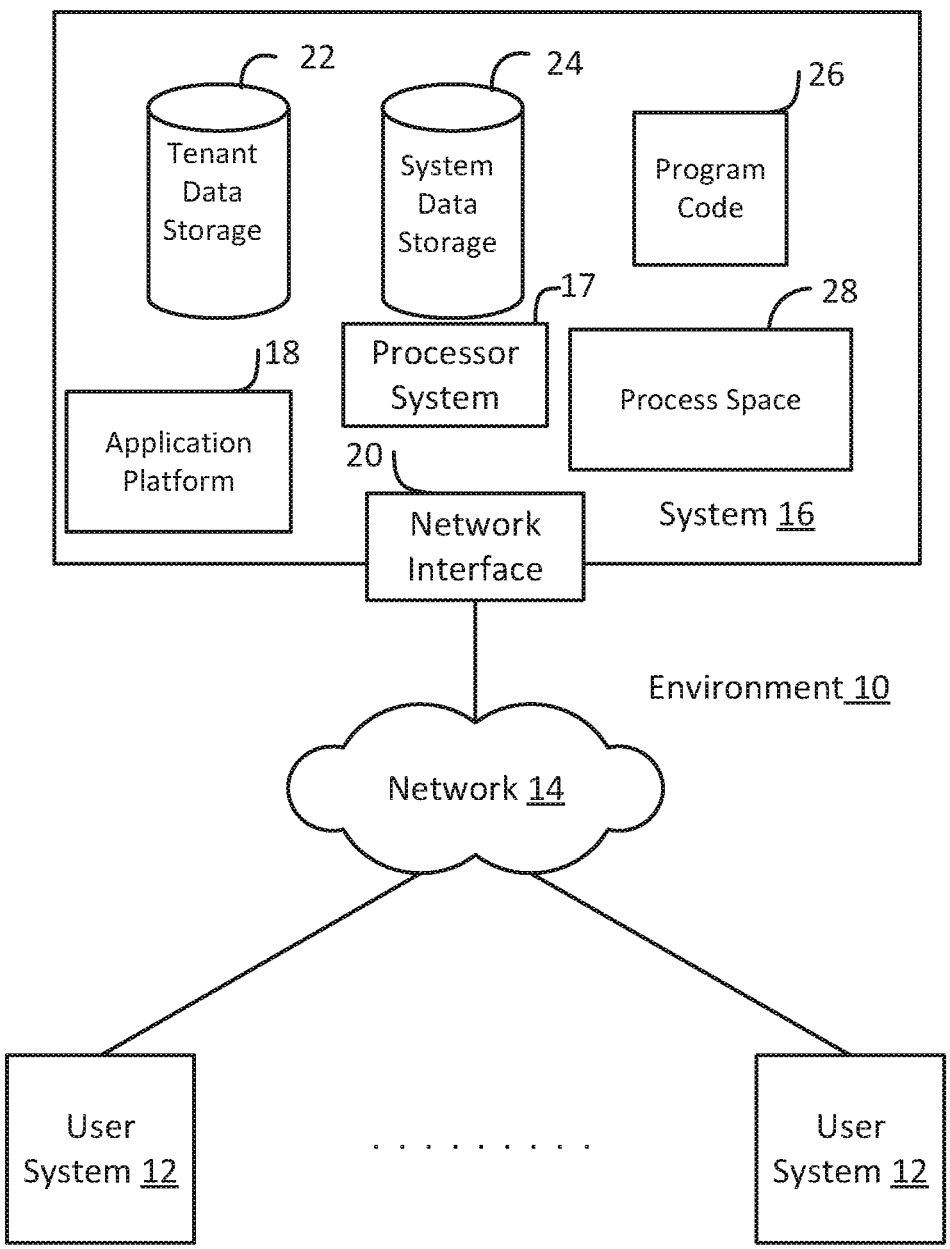
FIG. 1A shows a block diagram of an example environment in which an on-demand database service can be used according to some implementations.

Embodiments discussed herein provide mechanisms for querying (accessing) and storing large amounts of data from various data stores, which may have differing database structures and/or architectures. In embodiments, a multi-tenant database system may include tenant data that is dispersed across different types of databases and/or data stores. In an example, a tenant's data may reside in three different data stores, such as a relational data store (e.g., Oracle, etc.), a non-relational data store (e.g., Apache™ HBase™, BigObjects provided by Salesforce.com®, etc.), and external data stores (e.g., Extract-Load-Transform (ELT) data, Extract-Transform-Load (ETL) data, etc.). Additionally, the multi-tenant database system may provide a platform (e.g., a platform as a service (PaaS)) that allows tenant application developers to create multi-tenant (single instance of software runs on a server and serves multiple tenants) add-on applications, which integrate into the main multi-tenant database system and run on the multi-tenant database system infrastructure. One example of such a platform is Force.com® provided by Salesforce.com®. However, the scale of integrating data from various data stores having various structures/architectures to the platform may place severe restrictions on the types of queries allowed for individual data stores using existing query languages and/or development tools, thereby limiting developers' ability to meaningfully incorporate the various data sources into their applications.

Various embodiments provide an asynchronous (async) querying language (QL) may be used to provide developers with the ability to incorporate the various data stores and capabilities into their applications. According to various embodiments, the async QL may be an application programming interface (API) that allows users to submit jobs for asynchronous execution, expressed as a typically user query. The async QL may accept user-issued queries and return async job locators to the users. The async job locators may be used to poll for job statuses and/or cancel currently executing jobs. In this way, tenants may be able to manage jobs and make sure appropriate limits are applied in order to reduce resource overuse.

In embodiments, the jobs may be one of two types of jobs. A first job type may deposit query results into an entity (e.g., database object, memory location, etc.) specified by the user-issued query. The first job type may be referred to as a "persistent job" and the like. In embodiments, the user-issued query may include parameters that describe the target entity/location and/or field mappings from fields selected in a query to target entity fields. In an example using the first job type, the user-issued query may indicate tenant data to be transformed based on user-defined parameters in the user-issued query, and the database system may materialize the query results as tenant data in the user-specified entity/location. The first job type may support various external data store (e.g., ETL, ELT, etc.) use cases. A second job type may allow query results to be more ephemeral. In some embodiments the second job type may process query results based on user-defined parameters and discarded after processing. In other embodiments, the second job type may store query results temporarily as tenant data, and the temporarily stored data may be discarded after some predetermined amount of time. The second job type may be referred to as an "ephemeral job" and the like.

In various embodiments, the async QL may allow a database system to become "federated." The term "federated" may refer to a logical model over tenant data that may span multiple different underlying databases. The async QL may provide federated joins, aggregation of functions, group-by-firsts, etc. for the federated database system.

In embodiments, query results may be inserted into existing predefined database objects, which may allow future changes to be made to the async QL without requiring substantial versioning and schema revisions. In embodiments, the async QL may be implemented as a Representational State Transfer (REST or RESTful) API, Simple Object Access Protocol (SOAP) API, Apex API, and/or some other like API. The API may allow users to submit new async query jobs, cancel in-progress jobs, and view the status of jobs using a job locator.

In embodiments, a user system may issue a query (also referred to a "user-issued query") including typical query language statements, commands, etc., which indicate one or more target data objects. The user-issued query may be submitted to the database system via an async QL API. When a user-issued query is obtained by the database system, a query engine of the database system may translate the user-issued query into a distributed execution instruction set. In embodiments, the query engine may choose optimized query plans based on metadata pertaining to where tenant data resides physically, data model customizations, and the like. The query engine may also determine whether to move data or bring computation on the data to the database system based on data locality, tenant-specific scale, and/or other like parameters.

In embodiments, the distributed execution instruction set may indicate tenant data to be loaded to a cloud computing service; one or more processing operations to be executed (e.g., any filtering, aggregation, joins, etc. that was not done during the loading procedure); and a location or database objects for storing results of the processing. The distributed execution instruction set may be passed to a cloud computing service for execution. The cloud computing service may, in response to execution of the distributed execution set, load data from different data stores, process the query according to a generated query plan, and load query results into the target data object(s). In embodiments, the database system (or components thereof) may implement a MapReduce function to filter and sort jobs dynamically using predetermined scripts (e.g., Apache™ Pig Scripts). Since MapReduce operations can be expensive and relatively slow, some processing may be pushed to underlying data stores by, for example, passing the user-issued query to data stores that operate using that query language for information storage/retrieval. Limits or thresholds (also referred to as "governor limits") may also be imposed on MapReduce operations on a per-job or per-tenant basis. The limits or thresholds may be based one or more design choices and/or based on one or more empirical studies.

Embodiments also provide error handling mechanism. Conventional systems typically provide one error per record in response to a user-issued query, which is not scalable to millions to billions of records. In embodiments, the database system may sample the errors that are similar to one another based on internal hashing, and may provide a sample error instead of providing each and every error to the user system. This saves computational overhead for both the database system and the user system. In embodiments, the errors may include job level errors (e.g., errors relating to the job execution, syntax, etc.), and record level errors (e.g., where a job is completed but an error occurs in storing results in specified database object(s) due to validation rules, duplicates, etc.).

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatus, computer-implemented methods and computer-readable storage media for identifying articles helpful in resolving user queries.

In some implementations, the users described herein are users (or "members") of an interactive online "enterprise social network," also referred to herein as an "enterprise social networking system," an "enterprise collaborative network," or more simply as an "enterprise network." Such online enterprise networks are increasingly becoming a common way to facilitate communication among people, any of whom can be recognized as enterprise users. One example of an online enterprise social network is Chatter®, provided by salesforce.com, inc. of San Francisco, Calif. salesforce.com, inc. is a provider of enterprise social networking services, customer relationship management (CRM) services and other database management services, any of which can be accessed and used in conjunction with the techniques disclosed herein in some implementations. These various services can be provided in a cloud computing environment as described herein, for example, in the context of a multi-tenant database system. Some of the described techniques or processes can be implemented without having to install software locally, that is, on computing devices of users interacting with services available through the cloud. While the disclosed implementations may be described with reference to Chatter® and more generally to enterprise social networking, those of ordinary skill in the art should understand that the disclosed techniques are neither limited to Chatter® nor to any other services and systems provided by salesforce.com, inc. and can be implemented in the context of various other database systems such as cloud-based systems that are not part of a multi-tenant database system or which do not provide enterprise social networking services.

As used herein, the term "tenant" may include a group of users who share common access with specific privileges to a software instance. A multi-tenant architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In embodiments, the tenant data storage 22, the system data storage 24, and/or some other data store (not shown) may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a local area network (LAN), wide area network (WAN), telephone network, wireless network, cellular network, point-to-point network, star network, token ring network, hub network, or other appropriate configuration. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, WAP-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, and/or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
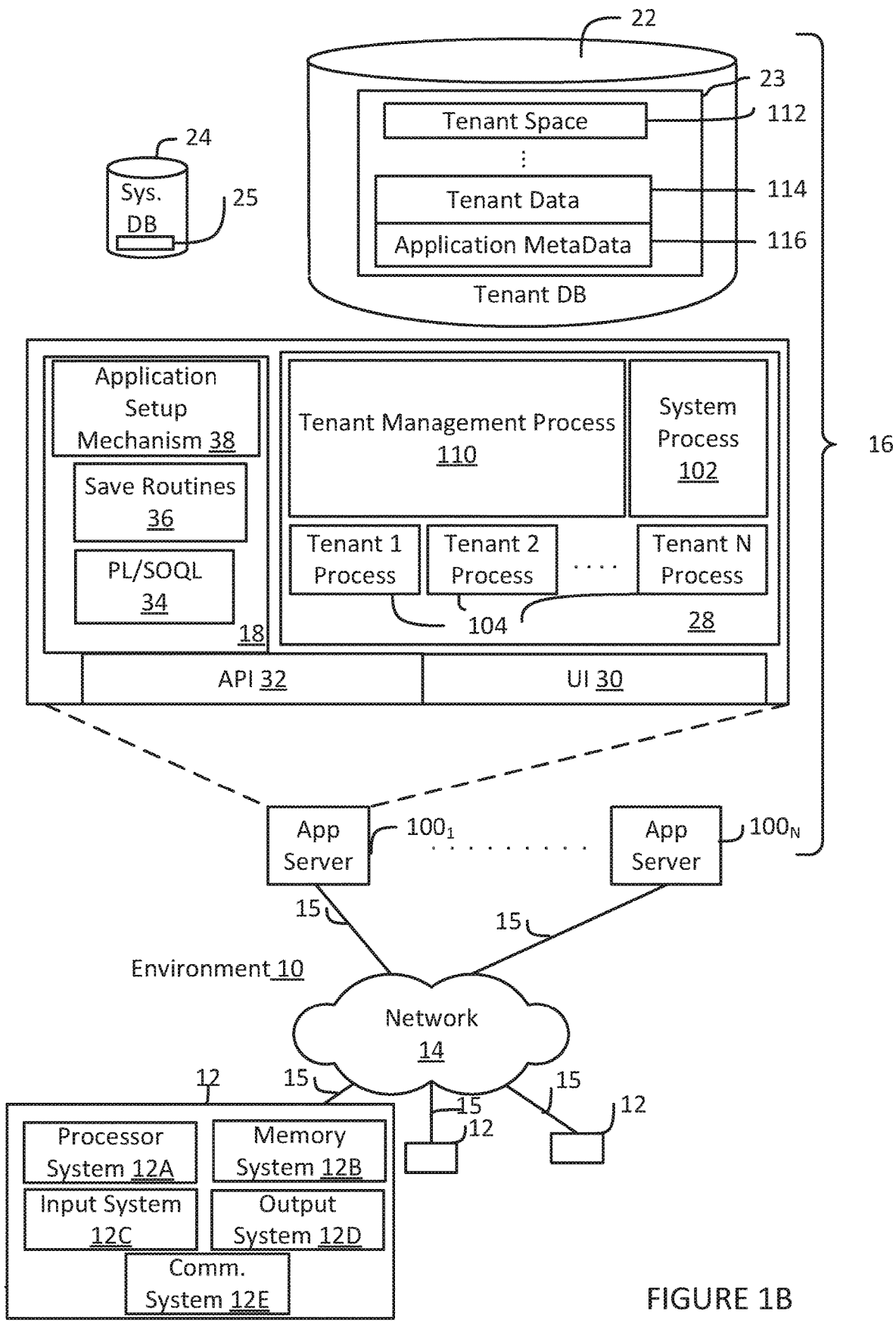
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors, one or more graphics processing units (GPUs), one or more field-programmable gate arrays (FPGAs), or any other electronic circuitry capable of executing program code and/or software modules to perform arithmetic, logical, and/or input/output operations. The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks. The communications system 12E may include circuitry for communicating with a wireless network or wired network. Communications system 12E may be used to establish a link 15 (also referred to as "channel 15," 'networking layer tunnel 15," and the like) through which the user system 12 may communicate with the database system 16. Communications system 12E may include one or more processors (e.g., baseband processors, etc.) that are dedicated to a particular wireless communication protocol (e.g., Wi-Fi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches, filters, amplifiers, antenna elements, and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the database system 16, the user system 12 using the communications system 12E may establish link 15 with network interface 20 of the database system 16.

In FIG. 1B, the network interface 20 is implemented as a set of HTTP application servers $100_1$-$100_N$. Each application server 100 (also referred to herein as an "app server", an "ELT node", a "ETL node", a "worker node", and the like) is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection 15. For example, one application server 100₁ can be coupled via the network 14 (for example, the Internet), another application server 100_{N-1} can be coupled via a direct network link 15, and another application server 100_N can be coupled by yet a different network connection 15. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. In this regard, each application server 100 may be configured to perform various database functions (e.g., indexing, querying, etc.) as well as formatting obtained data (e.g., ELT data, ETL data, etc.) for various user interfaces to be rendered by the user systems 12. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2:
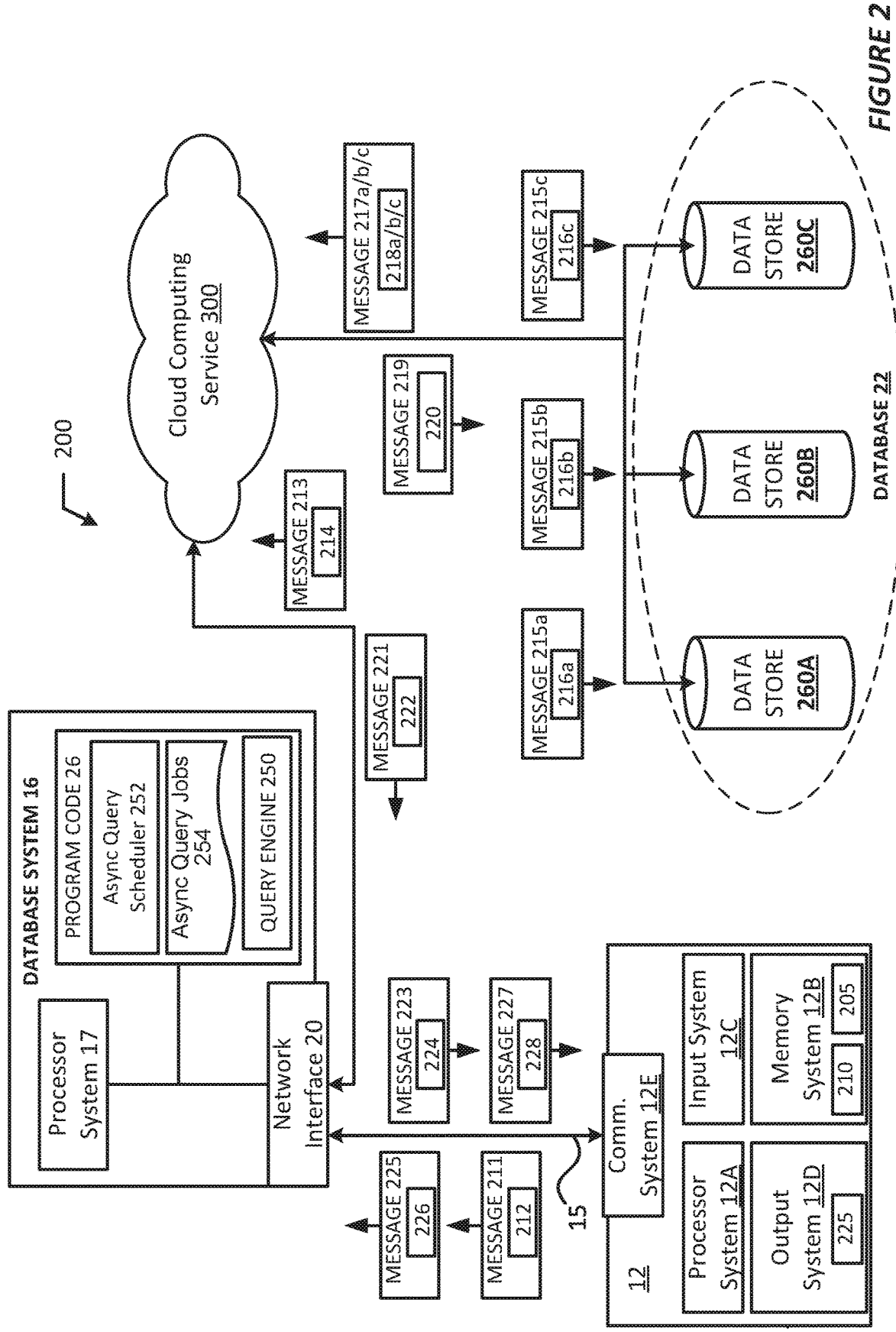
FIG. 2 shows an arrangement in which components of a user system interact with components of a database system in accordance with various embodiments.

FIG. 2 shows an arrangement 200 in which the components of a user system 12 interact with a cloud computing service 300 and components of the database system 16, in accordance with various example embodiments. As shown, the user system 12 may include the processor system 12A, the memory system 12B, the input system 12C, the output system 12D, and the communications system 12E discussed previously with regard to FIGS. 1A and 1B. The database system 16 may include the processor system 17, the network interface 20, the database 22, and the program code 26 as discussed previously with regard to FIGS. 1A and 1B. Additionally, although FIG. 2 shows the cloud computing service 300 and database system 16 as separate entities, in some implementations, the cloud computing service 300 and the database system 16 may be implemented and/or operated as a single entity such that the operations, procedures, functions, etc. discussed as being performed by the database system 16 may be performed by the cloud computing service 300 and vice versa.

Referring to the user system 12, the memory system 12B may include an operating system (OS) 205, application 210, and one or more databases (not shown). OS 205 may manage computer hardware and software resources, and provide common services for applications of the user system 12. OS 205 may include one or more drivers and/or APIs that provide an interface to hardware devices thereby enabling OS 205 and application 210 to access hardware functions. In some embodiments, the OS 205 may include middleware that may connect two or more separate applications or connect applications with underlying hardware components beyond those available from OS 205 and/or the drivers/APIs. The OS 205 may be a general purpose operating system or an operating system specifically written for and tailored to the user system 12.

The application 210 may be a software application designed to run on the user system 12, and may be used to access tenant data stored by the database system 16. The application 210 may be platform-specific, such as when the user system 12 is implemented in a mobile device, such as a smartphone, tablet computer, and the like. The application 210 may be a native application, a web application, or a hybrid application (or variants thereof). Application 210 may be developed with server-side development tools and/or programming languages, such as PHP, Node.js, ASP.NET, and/or any other like technology that renders HTML; using website development tools and/or programming languages, such as HTML, Cascading Stylesheets (CSS), JavaScript, JQuery, and the like; and/or using platform-specific development tools and/or programming languages (e.g., Salesforce® Apex, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), etc.). The term "platform-specific" may refer to the platform implemented by the user system 12 and/or the platform implemented by the database system 16. In some embodiments, the owner/operator of database system 16 may have pre-built the application 210 for use by agents of an organization/tenant, and a user of the user system 12 may be an agent of the organization/tenant. Suitable implementations for the OS 205, databases, and applications 210, as well as the general functionality of the user system 12 are known or commercially available, and are readily implemented by persons having ordinary skill in the art, particularly in light of the disclosure herein.

Regardless of whether the application 210 is implemented as a native application, web application, or hybrid application, the processor system 12A implementing the application 210 may be capable of requesting and obtaining data from database system 16, and rendering GUIs in an application container or browser. In various embodiments, the webpages and/or GUIs may include a data analytics GUI, such as Salesforce® Wave™ dashboard, which may provide visual representations of data residing in an enterprise cloud or in an on-demand services environment (e.g., a tenant space within database system 16). In embodiments, the GUI may include one or more graphical control elements, which may enable a user of the user system 12 to select visualization parameters (also referred to as "lens parameters" or "filters") for displaying data from one or more datasets. A dataset may be a specific view or transformation of data from one or more data sources (e.g., a tenant space of database 22, data stores 260A-C, etc.). The visualization parameters may include, for example, a selection of data or data type to display from one or more datasets; a particular graph, chart, or map in which to view the selected data; color schemes for the graphs/charts/maps; a position or orientation of the graphs/charts/maps within the GUI, etc. The graphs/charts/maps to be displayed may be referred to as a "lens" or a "dashboard". A lens may be a particular view of data from one or more datasets, and a dashboard may be a collection of lenses. In embodiments, the GUI may display lenses, dashboards, and/or control panels to alter or rearrange the lenses/dashboards.

In embodiments, when the user of the user system 12 selects one or more graphical control elements to alter the visualization parameters, the application 210 may generate one or more queries to be sent to the database system 16. For example, the processor system 12A may implement the application 210 (e.g., by executing program code and/or software modules of the application 210) to generate and send a request message 211 (also referred to as "request message 211", "user-issued request message 211", and the like) to the database system 16 in response to a user input (e.g., a selection of a graphical control element). In embodiments, the request message 211 may include request parameters 212. The request parameters may include a query (also referred to as a "user issued query" and the like) for one or more data values of the one or more datasets, records, and/or fields stored in database 22 and/or data stores 260A-C. For the purposes of clarity, the user-issued query included in the request parameters 212 may also be referred to as "user-issued query 212", "query 212", and the like. The application 210 may utilize any suitable querying language to query and store information the database 22 and/or data stores 260A-C, such as an object query language (OQL), Salesforce® OQL (SOQL), Salesforce® object search language (SOSL), Salesforce® analytics query language (SAQL), and/or other like query languages. In embodiments, the request message 211 may be an HTTP message and the request parameters 212 may be located in the header or body portion of the HTTP message. In one example, the request message 211 may be an HTTP POST message, where the body of the POST message may include the request parameters 212 as a JavaScript Object Notation (JSON) encoded list. Other message types may be used to convey the request message 211, such as any of the Internet protocol messages discussed with regard to FIGS. 1A-1B. The request parameters 212 may be located in the header or body portion of such messages.

According to various embodiments, the request parameters 212 may include one or more of the following: a query in OQL, SOQL, SOSL, SAQL, etc. format (e.g., q="select NewValue, CreatedBy.FirstName from FieldHistoryArchive where CreatedBy.firstName='Eli'"); target objects (targetObject) indicating the database objects where results of request parameters 212 execution are written and may be a standard or custom regular SObject, BigObject, or external SObject (e.g., targetObject="MyTargetObject_c"); one or more target fields (targetFields) indicating the query fields that correspond to target SObject fields, which can be done via an explicit mapping between query fields and target fields by name (e.g., targetFields={"NewValue":"Target-NewValue_c", "CreatedBy.FirstName": "TargetF irstName_c"}); and target job fields (targetJobIdField) to indicate a field name identifier (ID) and/or field type or lookup where the async query would insert job identifiers (e.g. targetJobIdField="asyncQueryJob_c").

In some embodiments, the request parameters 212 may also include a "run as user" parameter (e.g., "runAs=[user_id]"), where the query 212 may be executed as that user and conform to the user's sharing and FLS/CRUD on SObjects traversed in the query as well the target SObject. If this parameter is not used, the query 212 may be run as an automated process user. In some embodiments, the request parameters 212 may also include an "update existing rows" parameter (e.g., "update=true") to update existing rows in an SObject and/or BigObject. For example, if a customer stores click stream data in a BigObject that is related to an SObject"Account", the user may want to write an async query that runs once a month, counts clicks per account and populates a custom Clicks_c field on Account. In this case, the user would need to include the ID field of the target object in the targetFields map so that the database system 16 may update the existing records in Account.

TABLE 1

Example HTTP POST message

POST /services/data/v32.0/asyncQuery HTTP/1.1
Host: https://org62.my.salesforce.com
[other headers]
{
query="select NewValue,CreatedBy.FirstName from FieldHistoryArchive",
target="MyResult_c",
targetFields={"NewValue":"TargetNewValue_c", "CreatedBy.FirstName":"TargetFirstName_c"},
targetJobIdField="asyncQueryJob_c"
}

An example HTTP POST message including some of the aforementioned request parameters 212 is shown by table 1. In the example HTTP POST message of table 1, the query may be the user-issued query 212 in SOQL format; the target may be the target object; targetFields may be the target field for storing results of the query; and targetJobIdField may indicate a field ID where job identifiers should be stored.

Regardless of the message type, the request message 211 may be sent to the database system 16. The request message 211 may be obtained by the database system 16 via the network interface 20. The database system 16 may include program code 26, which may include query engine 250 and async query scheduler (AQS) 252, in addition to program code used for implementing the various functions of the database system 16. The program code 26, including program code of the query engine 250 and AQS 252 may be executed by the processor system 17 to perform various operations, procedures, functions, etc. as discussed herein.

In embodiments, the query 212 may include an API call or other like instruction indicating that the query 212 should be treated as an aysnc query. Such an instruction may be referred to as an "async query verb." Additionally, in various embodiments, async queries may be tracked and managed with their own life cycles. To support this, each time an async query is invoked (e.g., when the query 212 includes an async query verb), the query engine 250 or the AQS 252 may generate a corresponding async query job 254 (also referred to as an "async job 254", "AQJ 254", "job 254", and the like) entity. An AQJ 254 entity may be a record or database object that stores various values, statistics, metadata, etc. during the lifecycle of the query 212. As shown by FIG. 2, the program code 26 may store the AQJ 254 entities, however, in other embodiments, the AQJs 254 may be stored elsewhere by the database system 16. In embodiments, the AQJ 254 entities may include one or more of the fields shown by table 2.

TABLE 2

Example Async Query Job Fields

| Field Name | Type | User Visible | Description |
| --- | --- | --- | --- |
| CreatedById | String | Yes | Unique identifier (ID) of user or user system that issued the async query; may be an organization identifier (org_id) user identifier (user_id) associated with the user; IP address, temporary ID, random ID, and/or other like ID. |
| AsyncQueryJobId | String | Yes | Unique ID assigned to the async query job by the async query scheduler. |
| CreatedDate | DateTime | Yes | Time and/or date the record was created, which may correspond to when the async query was submitted. |
| StartTime | DateTime | Yes | Time and/or date the async query entered the "running" state. |
| End (or EndTime) | DateTime | Yes | Time and/or date the async query was completed. |
| QueryEngine | Enum | No | Unique ID assigned to the async query job for the async query. Unique ID of query engine used to process the async query. |

TABLE 2-continued

Example Async Query Job Fields

| Field Name | Type | User Visible | Description |
| --- | --- | --- | --- |
| QueryEngineJobId | String | No | Unique ID assigned to the async query job by the query engine. Nullable polymorphic field that can reference a child job associated with the query engine used to process the async query. |
| Status | Enum | Yes | Indicator that represents the current state of the async query job. |
| StatusMessage | String | Yes | Details about the job. Primarily used to log a message when a job fails. |
| Query | String | Yes | User-issued query to be executed (e.g., may be the query in SOQL format). |
| NumberOfResults | Number | Yes | The raw number of results that was the output of the async query. |
| ResultsStored | Number | Yes | The number of result records that successfully written to the destination object. |
| ResultsDiscarded | Number | Yes | The number of result records that were discarded because of exceeding write limits. |
| ResultsFailed | Number | Yes | The number of result records that failed to write to the target object because of validation rule failures (e.g., row-level UPSERT (insert, on conflict update) failures). |
| LimitTypeEnum | Enum | No | Indicates type of limits that may be imposed on particular users or tenants/organizations; may include AsyncQueryTotalRequests, AsyncQueryConcurrentRequests, AsyncEntitiesTraversed and/or other limits. |
| AsyncQueryTotalRequests | Number | No | Limit: The maximum number of queries that are permitted to be submitted or executed in a predetermined time period by a tenant/organization and/or a user; may have predefined default value. |
| AsyncQueryConcurrentRequests | Number | No | Limit: The maximum number of concurrent async queries that are permitted to be submitted or executed by a tenant/organization and/or a user; may have predefined default value. |
| AsyncEntitiesTraversed | String or Enum | No | Limit: indicates limits on complexity of a query submitted by a tenant/organization and/or a user. |

As shown in table 2, each AQJ 254 entity may be associated with a unique identifier (e.g., AsyncQueryJobId). The AsyncQueryJobId may be used by users and system administrators to track individual AQJs 254. In one example, the operator of the database system 16 may implement a webpage or other like GUI that allows users to track ongoing AQJs 254 for each AsyncQueryJobId using the status field. This webpage/GUI may also allow the user to view any of the field values for fields that are listed as "yes" in the "user visible" column of table 2. Additionally, the webpage/GUI may also provide graphical control elements that allow users to cancel, pause, and/or restart an ongoing AQJ 254 for a selected AsyncQueryJobId.

In another example, the operator of the database system 16 may implement a single system administrator (admin) webpage/GUI that allows system admins (also referred to as "black tab users" and the like) to view all of the fields listed in table 2, as well as terminate selected AQJs 254, and batch AQJs 254, load jobs, or other underlying jobs that have been spawned. In embodiments, the webpage/GUI may also display tenant limits and resource utilization within tenant organizations and across app servers. The system admins may use the webpage/GUI to assign/define a set of limits for different dimensions of an AQJ 254.

To set the tenant limits, the AQJ 254 entities may store values for various limit types (e.g., LimitTypeEnum values) that can be configured on a tenant-by-tenant basis. For example, the system admin may configure the AsyncQueryConcurrentRequests for a first tenant so that the first tenant may be permitted to run multiple concurrent AQJs 254, the system admin may configure the AsyncQueryConcurrentRequests for a second tenant so that the second tenant may only be allowed to run a single AQJ 254 at a time. These values may be based on various parameters/criteria, such as current resource consumption, overload conditions, subscription information, and the like. Such parameters/criteria may be viewed using the system admin webpage/interface.

In some embodiments, the limits may be static values, while in other embodiments the limits may be dynamically configured. For instance, the async query model discussed herein may be designed to execute queries at different times (e.g., not immediately after query submission), and therefore, execution of scheduled AQJs 254 may be scaled up or down based on system resource availability and/or user/tenant preferences (e.g., a user selected priority parameter indicated by the query 212, a user selected update time/date indicated by the query 212, and the like).

Once the AQJ 254 entity is generated, the AQS 252 may schedule the AQJ 254 for conversion into a distributed execution instruction set (DEIS) 214 for execution (discussed infra). The AQS 252 may be a software component that controls the conversion of AQJs 254 into DEISs 214; regulates job dependencies, priorities, and queuing; and controls termination, pausing, and (re-)starting of job conversion based on queue position, user inputs, predefined limits (see e.g., table 2), system resource utilization, and/or other events or triggers. In embodiments, the AQS 252 may also take into account the available computing resources the system 16 needs to service the query 212 and may dynamically adjust how many queries 212/AQJs 254 can run concurrently, which could include pausing existing jobs. To perform these functions, the AQS 252 may place the AQJs 254 in various states as shown by table 3.

TABLE 3

Example State Transitions for Async Query Jobs

| State Transition | Description |
| --- | --- |
| Scheduled | When a new async query request is obtained by the system 16, a new AQJ 254 in the scheduled state is created. |
| Scheduled → Running | If the tenant/user has not exceeded limits, and after successfully submitting an AQJ 254, the AQJ 254 is transitioned to the running state; may be placed in running state based on queue position, user inputs, priority, etc. |
| Scheduled → Failed | If a user-issued query 212 includes errors or otherwise fails (e.g., due to system failures) before entering the running state, the AQJ 254 is not submitted to query engine 250 for conversion to DEIS 214, and is transitioned to the failed state. The errors may include job level errors and/or record level errors. |
| Scheduled → Killed/Terminated | When an AQJ 254 is ended before the AQJ 254 leaves the scheduled state; may occur based on input/command from a black tab user or a tenant developer via a GUI. |
| Scheduled → Rejected | If a tenant/user has exceeded any limits before entering the running state, the AQJ 254 is not submitted to query engine 250 for conversion to DEIS 214, and is transitioned to the rejected state. |
| Running → Failed | When an AQJ 254 an underlying DEIS 214 job fails after the system 16 successfully submits the DEIS 214 for execution, the DEIS 214 may be placed in the failed state. When the underlying DEIS 214 job is failed, the failure may be conveyed in the QueryEngineJobId field or the status field. Once the DEIS 214 job has been identified as being failed, the AQJ 214 may also be marked as failed. The errors may include job level errors and/or record level errors. |
| Running → Killed/Terminated | When a DEIS 214 job is ended after the system 16 successfully submits the DEIS 214 for execution; may occur based on input/command from a black tab user or a tenant developer via a GUI. When the underlying DEIS 214 job is killed/terminated, the termination may be conveyed in the QueryEngineJobId field. Once the DEIS 214 job has been identified as being killed/terminated, the AQJ 214 may also be marked as killed/terminated. |
| Running → Rejected | If a tenant/user has exceeded any limits after entering the running state, the AQJ 254 is not submitted to query engine 250 for conversion to DEIS 214, and is transitioned to the rejected state. |
| Running → Success | If the underlying DEIS 214 job succeeds, the system 16 may mark the AQJ 254 status field as "success" or "stored". |

Table 3 shows examples states that an AQJ 254 can go through and provides details about the mechanics of each state transition. It should be noted that in some embodiments, prior to placing an AQJ 254 in the running state, the AQS 252 may determine whether the AQJ 254 includes any errors, is terminated/killed, or whether any associated limits have been exceeded. If the AQS 252 does not detect any errors, failures, limits, etc., the AQS 252 may place the AQJ 254 in the running state. When the AQJ 254 is placed in the running state, the query engine 250 may begin converting the AQJ 254 into the DEIS 214 for execution. After the AQJ 254 is placed in the running state, the AQS 252 may obtain or identify whether the AQJ 254 has failed, succeeded, or been rejected based on fields of the AQJ 254 (see e.g., table 2) that are changed/edited by the query engine 250.

The query engine 250 may be program code and/or software modules that takes a description of a search request, processes/evaluates the search request, executes the search request, and returns the results back to the calling party. In response to execution of the program code 26, the database system 16 may implement or perform the various tasks, operations, procedures, processes, etc. of the various embodiments discussed herein. The query engine 250 (also referred to as a "query processor 250", "query plan generator 250", and the like) may be program code that obtains a query 212 (e.g., from request message 211 via the network interface 20), translates or converts the query 212 into a native query, evaluates and executes the native query, and returns results of the query back to the issuing party (e.g., user system 12). To perform these functions, the query engine 250 may include a parser, a query optimizer, database manager, compiler, execution engine, and/or other like components that are not shown by FIG. 2. According to various embodiments, additionally or alternatively to performing the functions discussed previously, the processor system 17 implementing the query engine 250 may identify/extract the query 212 from the request parameters 212, and convert the query 212 into a distributed execution instruction set (DEIS) 214 based on instructions/commands received from the AQS 252.

The DEIS 214 may be a script, series of statements, or other like data structure that is used to access data in a distributed database system. In embodiments, the DEIS 214 may be based on load parameters, processing parameters, and storage parameters. The load parameters may indicate various data items (e.g., files or directories) to be obtained from the data stores 260A-C. The processing parameters may indicate various operations to be performed on the loaded data items, such as filter operations, join operations, aggregation operations, etc. The storage parameters may indicate one or more database objects in which to store the processed data items. In embodiments, the query engine 250 may include a conversion component (not shown by FIG. 2) to convert the query 212 into the DEIS 214. In embodiments that include Apache™ Pig™ implementations, the query engine 250 may convert the query 212 into a Pig Latin script, which may then be converted into a DEIS 214 comprising a series of MapReduce (MR) statements or MR jobs. It should be noted that in Apache™ Pig™ implementations, the term "distributed execution instruction set" or "DEIS" may refer to the Pig Latin script and the MR statements/jobs.

As discussed previously, the query engine 250 may include a parser. The parser may check the query 212 and/or the DEIS 214 (depending on the implementation) for proper syntax, and may also issue syntax error(s) when a query 212 includes syntax that is not recognized by the parser. The parser may also translate commands in the queries 212 into an internal format that can be operated on by other components of the query engine 250. In some cases, the output of the parser may be a query tree (also referred to as a "parse tree", a "sequence tree", etc.) or some other data structure that represents logical steps used to execute a user-issued query 212. In embodiments that include Apache™ Pig™ implementations, the output of the parser may be a directed acyclic graph (DAG), which may represent Pig Latin statements and logical operators. Once generated, the logical plan (e.g., query tree, DAG, etc.) may be provided to the query optimizer.

As discussed previously, the query engine 250 may include a query optimizer of (also referred to as a "query builder", "optimizer", and the like), which may be program code that may analyze the user-issued query 212, and may translate the query 212 into an executable form (e.g., a DEIS 214) using one or more selected query plan(s) for execution. The query plan(s) may indicate an order of operations used to access data from one or more of the data stores 260A-C. In this regard, the optimizer may select individual query plans for each of the data stores 260A-C, where each individual query plan may be unique to the data store from which data is to be obtained. For example, the query engine 250 may select/generate a first query plan to obtain data from the first data store 260A, select/generate a second query plan to obtain data from the second data store 260B, and select/generate a third query plan to obtain data from the third data store 260B. In embodiments that include Apache™ Pig™ implementations, the DAG may be passed to the optimizer to carry out logical optimizations, such as projections and pushdowns.

Additionally, the query engine 250 may include a compiler that obtains the optimized logical plan from the optimizer, and compiles the optimized logical plan into the DEIS 214, which includes a series of commands or operations to be executed by the database 22. In embodiments that include Apache™ Pig™ implementations, the DEIS 214 may comprise a series of MR jobs output by the compiler of the query engine 250.

In some embodiments, there may be multiple query engines 250 (not shown by FIG. 2), each of which may process different types of async queries. For example, different queries 212 may use different query engine technologies, such as using a first query engine technology (e.g., Apache™ Pig™) for relatively complicated queries, such as queries that require cross-store joins and the like; and using a second query engine technology (e.g., Apache™ Phoenix) for relatively simple queries. In such embodiments, a first async query verb may be used to invoke a first query engine 250 that implements the first query engine technology and a second async query verb may be used to invoke the second query engine 250 that implements the second query engine technology. In this way, the underlying query engine technology may change over time as query engine technology evolves.

Once the DEIS 214 is generated, the query engine 250 may pass the DEIS 214 to the network interface 20 for transmission to the cloud computing service 300 in a message 213. In embodiments, the message 213 may be any type of Internet protocol message, such as those discussed with previously, and/or a proprietary or platform-specific message type used specifically for communicating the cloud 300.

The cloud computing service 300 (also referred to as "cloud 300" and the like) may be a system of computer devices (e.g., servers, storage devices, applications, etc. within or associated with a data center or data warehouse) that provides access to a pool of computing resources. The term "computing resource" may refer to a physical or virtual component within a computing environment and/or within a particular computer device, such as memory space, processor time, electrical power, input/output operations, ports or network sockets, and the like.

The cloud 300 may be a private cloud, which offers cloud services to a single organization (e.g., the cloud 300 may be owned/operated by an owner/operator of database system 16); a public cloud, which provides computing resources to the general public and shares computing resources across all customers/users; or a hybrid cloud or virtual private cloud, which uses a portion of resources to provide public cloud services while using other dedicated resources to provide private cloud services. For example, the hybrid cloud may include a private cloud service that also utilizes one or more public cloud services for certain applications or users, such as providing obtaining data from various data stores 260A-C. In embodiments, a common cloud management platform (e.g., implemented as various virtual machines and applications hosted across the cloud 300 and database system 16) may coordinate the delivery of dataset updates such that the user system 12 may not be aware that the cloud 300 exists. In this regard, the cloud 300 may provide an Infrastructure as a Service (IaaS) or a Platform as a Service (PaaS) cloud service model.

In embodiments, the cloud 300 may include a cloud manager, a cluster manager, master node, and a plurality of secondary (slave) nodes. Each of these elements may include one or more computer devices, which may include processor systems, memory systems, input systems, output systems, interface/communications systems, and/or other like components. Each of these elements may be connected with one another via a LAN, fast LAN, message passing interface (MPI) implementations, and/or any other suitable networking technology. Example implementations of cloud 300 may include Apache Mesos™, Apache Hadoop®, Apache™ Aurora™, Apache™ Chronos™, Apache Marathon™, Apache Spark™ WildFly™ provided by Red Hat, Inc., Memecached, MPI, and Node.js, Ruby on Rails, and/or the like. A detailed description of some cloud service implementations are discussed in commonly assigned U.S. application Ser. No. 15/374,906, titled SYSTEMS AND METHODS FOR PROVIDING UPDATES FOR DATA VISUALIZATION, by Santhosh Kumar Kuchoor et al., filed on Mar. 20, 2017, and hereby incorporated by reference in its entirety and for all purposes.

Regardless of the type of cloud services that cloud 300 provides, the database system 16 may utilize the cloud 300 (or portions thereof) to execute the operations, procedures, etc. defined by the DEIS 214. In typical implementations, one or more app servers $100_1$-$100_N$ (FIG. 1B) may obtain data from various sources (e.g., database 22), create indexes for the data, convert data into a format that can be rendered by various user interfaces, serve data to user systems 12, and the like. However, due to the high volume of data stored in the database 22 (including different data stores 260A-C), and the high resource utilization required to process the queries; in various embodiments, data items may be processed for user consumption by offloading these tasks to various nodes within the cloud 300. Furthermore, the offloading of data access and processing to nodes within the cloud also alleviate issues related to configuring the app servers $100_1$-$100_N$ to access/store data in the data stores 260A-C, which have different database structures.

In various embodiments, the cloud 300 (or a portion thereof) may obtain the message 213 from the database system 16, identify the DEIS 214 in the message 213, and execute the DEIS 214. Executing the DEIS 214 may include sending messages 215a-c to corresponding ones of the data stores 260A-C (e.g., message 215a may be sent to data store 260A, message 215b may be sent to data store 260B, and message 215c may be sent to data store 260C). The messages 215a-c may include executable commands 216a-c for retrieving and/or storing data in the corresponding data stores 260A-C (e.g., message 215a may include commands 216a, message 215b may include commands 216b, and message 215c may include commands 216c). In embodiments that include Apache™ Pig™ implementations where the DEIS 214 comprises a series of MR jobs, the commands 216a-c may be individual MR jobs (also referred to as "MR jobs 216" and the like) that may be executed in parallel.

Each MR job 216 may comprise a map step and a reduce step. The map step may be an initial ingestion and transformation of individual input records to be processed in parallel, and the reduce step may include aggregation of all records that can be processed together by a single entity/node.

In response to receipt of the commands 216a-c, the individual data stores 260A-C may determine/identify and obtain any indicated database objects, data items, etc., and provide the obtained data 218a-c to the cloud 300 in a message 217a-c. FIG. 2 shows a single "message 217/a/b/c" including a single "data item 218a/b/c" for the sake of simplicity, however it should be understood that the individual data stores 260A-C may send individual messages 217 including corresponding data items 218 (e.g., e.g., a message 217a may include data items 218a, a message 217b may include data items 218b, and a message 217c may include data items 218c). In various embodiments, when the cloud 300 (or portion thereof) obtains the data items 218a-c, the cloud 300 may convert those data items 218a-c into a format for storage (e.g., data items 220) in one of the data stores 260A-C. As an example, the cloud 300 may package the converted data items 220 in a message 219 for storage in the data store 260A at an identified location (e.g., database objects indicated by the user-issued query 212). Additionally, the messages 217 may also indicate whether any job level errors occurred (e.g., when data items 218 are inaccessible) and/or whether any record level jobs occurred (e.g., when some or all data items 220 were not able to be stored in the identified database object). The messages 217a-c and 219 may be any type of Internet protocol message, such as those discussed previously, and/or proprietary protocol messages.

The data stores 260A-C may each comprise one or more data storage devices that act as a repository for persistently storing and managing collections of data according to a predefined database structure. Additionally, one or more of the data stores 260A-C may be a distributed data store comprising a network of a plurality of data storage devices. In embodiments, each of the data stores 260A-C may have a different database structure.

For example, data store 260A may employ a relational database structure that includes various database objects. As used herein, a "database object" may refer to any representation of information in a database that is in the form of an object or tuple, and may include variables, data structures, functions, methods, classes, database records, database fields, database entities, associations between data and database entities (also referred to as a "relation"), and the like. In embodiments, the data stored 260A may also store "SObjects", which may be any database object that is specific to the database system 16. In various implementations, SObjects may be database objects that are accessible and writable using the query language used by the user system (e.g., SOQL). Example implementations of data store 260A may include the Force.com platform provided by Salesforce.com®, Database 12c available from Oracle®, DB2 available from IBM®, ACCESS available from Microsoft®, and/or the like.

In this example, data store 260B may employ a non-relational distributed database structure (e.g., a NoSQL database) that includes various database objects that are not stored using relations. In various embodiments, the data objects stored in data store 260B may include object types that are different than those stored by data store 260A and/or 260C. In some implementations, these database objects may be referred to as "BigObjects." In various implementations, BigObjects may be database objects that are immutable (e.g., once created and populated, such objects cannot change their form) and accessible using a suitable scripting language (e.g., Apache™ Pig™ Latin). Example implementations of data store 260B may include Gridforce provided by Salesforce.com®, HBase™ provided by Apache™ Software Foundation which runs on top of Apache™ Hadoop®, BigTable provided by Google®, and/or the like. A detailed description of some BigObject implementations are discussed in commonly assigned U.S. application Ser. No. 14/542,342, titled ASYNCHRONOUS SEARCH FOR BIG OBJECTS, by Eli Levine et al., filed on Nov. 14, 2014, and hereby incorporated by reference in its entirety and for all purposes.

In this example, data store 260C may comprise data from sources that are external to the database system 16, and may employ a relational database structure and/or a non-relational database structure. In embodiments, data store 260C may include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the data store 260C and stored as key-value pairs, which may allow the data to be stored in a mostly native form without requiring substantial normalization or formatting.

According to various embodiments, the cloud 300 (or portions thereof) may provide status information 222 to the database system 16 in a message 221. The status information 222 may indicate the progress or current state of the DEIS 214 job. In response to receipt of the status information 222, the processor system 17 may implement the ASQ 252 to change the state of the AQJ 254 (see e.g., table 3) and/or one or more AQJ 254 fields (see e.g., table 2) to reflect the changed state.

In some embodiments, the query engine 250 and/or the AQS 252 may generate and send a response message 223 (also referred to as "response") including the response parameters 224 to the user system 12. The response parameters 224 may comprise various status indicators may comprise information regarding the status of the AQJ 254 based on the user-issued query 212. In some embodiments, the response parameters 224 may be formatted in a computer-readable form that can be compiled and rendered as a visual representation 225 by the output system 12D. For example, the response parameters 224 may be one or more XML documents, one or more JSON documents, and/or some other suitable data format that may be decoded and rendered by a browser implemented by the user system 12. Once the response 223 is received by the user system 12, the processor system 12A implementing the application 210 may extract the response parameters 224 and generate a visual representation 225, which may be displayed using the output system 12D. These messages may be any type of Internet protocol message, such as those discussed previously, and/or proprietary protocol messages.

In embodiments, the response message 223 may be an HTTP message and the response parameters 224 may be located in the header or body portion of the HTTP message. In one example, the response message 223 may be an HTTP Response message, where the body of the Response message may include the response parameters 224 as a JSON encoded list. Other message types may be used to convey the response parameters 224, such as any of the message types discussed herein, and the response parameters 224 may be located in the header or body portion of such messages.

According to various embodiments, the response parameters 224 may include one or more of the following: an async query job ID (asyncQueryJobID), which may be the ID of an SObject for tracking the progress of an AQJ 254; and/or a message that may indicate errors and/or failures related to the user-issued query 212 and the reasons or causes for the errors/failures. For example, where HTTP messages are used, HTTP status codes (or variants thereof) may be used to indicate success, failure, and/or errors. Example HTTP Response messages including the aforementioned response parameters 224 are shown by tables 4 and 5.

TABLE 4

Example HTTP Response message (Accepted)

HTTP/1.1 201 Created
[other headers]
{
Status: "SCHEDULED",
Id:"1QAxx0000000001",
SOQL="select NewValue,CreatedBy.FirstName from
FieldHistoryArchive",
targetObject="MyResult__c",
targetFields={"NewValue":"TargetNewValue__c",
"CreatedBy.FirstName":"TargetFirstName__c"},
[other fields omitted]
}

In the example HTTP Response message of table 4, the HTTP status code 201 (Created) may indicate that an AQJ 254 was properly created. The example HTTP Response message of table 4 also includes the "Status" property to indicate the AQJ state (e.g., "scheduled" as shown by table 4); the "SOQL" property to indicate the user-issued query 212 in SOQL format; the "ID" property to indicate the AQJ ID (asyncQueryJobID); and the target object (targetObject) and the target fields (targetFields) properties to store results of the query. In embodiments, the AQJ fields (targetObject and/or targetFields) may indicate the setup entities where an AQJ 254 is stored. A JSON representation of that entity's publicly visible fields may be returned in the AQJ fields, if found.

TABLE 5

Example HTTP Response message (Bad Request Error)

HTTP/1.1 400 Bad Request
[other headers]
{ message:"INVALID__FIELD: select Blah from Account
ERROR at Row:1:Column:8 ... "}

In the example HTTP Response message of table 5, the HTTP status code 400 (Bad Request) may be used to indicate that there was a user error in invoking the async query API (e.g., improper syntax, and the like). The example HTTP Response message of table 5 also includes the "message" property to indicate the error as "INVALID FIELD." In other examples, HTTP status code 401 (Unauthorized) may be used to indicate that the user is not authorized to invoke the async query API, HTTP status code 404 (Not Found) may indicate that one or more database objects were not found, and HTTP status code 500 (Internal Server Error) may be used to indicate that there was a system error in invoking the async query API.

In embodiments, the user system 12 may also generate and send a request message 225 (also referred to as a "request 225") including request parameters 226 to the database system 16 and/or to the cloud 300 by, for example, implementing application 210. In response to the request 225, the database system 16 and/or the cloud 300 may provide a response message 227 including status parameters 228.

The request parameters 226 may comprise the same or similar properties as the request parameters 212, and the request message 225 may be the same or similar as the request message 211. In one example, the request message 225 may be an HTTP GET message, where the body of the GET message may include the request parameters 226 as a JSON encoded list. Additionally, the response parameters 228 may comprise the same or similar properties as the request parameters 224, and the response message 227 may be the same or similar as the response message 223. In one example, the response message 227 may be an HTTP Response message, where the body of the Response message may include the response parameters 228 as a JSON encoded list. Other message types may be used to convey the response parameters 228 and the request parameters 226, such as any of the message types discussed herein, and the response parameters 228 and the request parameters 226 may be located in the header or body portion of such messages.

According to various embodiments, the request parameters 226 may include an AQJ ID (asyncQueryJobID). In some embodiments, the request parameters 226 may include a status message indicating or instructing the database system 16 (AQS 252) to provide a status of the AQJ 254 indicated in the AQJ ID property. The response parameters 228 may include the AQJ ID and/or a message to indicate errors and/or failures related to the user-issued query 212 and the reasons or causes for the errors/failures. Additionally, where HTTP messages are used, HTTP status codes (or variants thereof) may be used in the HTTP response messages to indicate success, failure, and/or errors. Example HTTP GET and Response messages including the aforementioned parameters are shown by tables 6, 7, and 8.

TABLE 6

Example HTTP GET message

GET /services/data/v32.0/asyncQuery/1QAxx0000000001 HTTP/1.1
Host: https://org62.my.salesforce.com
[other headers]

TABLE 7

Example HTTP Response message (Accepted)

HTTP/1.1 200 OK
[other headers]
{
Status:"IN PROGRESS",
Id:"1QAxx0000000001",
SOQL="Select ...",
ResultCount=30056,
[other fields omitted]
}

In the example HTTP GET message of table 6, the AQJ 254 ID may be "1QAxx0000000001". In the example HTTP Response message of table 7, the HTTP status code 200 (OK) may indicate that an AQJ 254 was properly retrieved in response to the HTTP GET message of table 6. The example HTTP Response message of table 7 also includes the status property to indicate that the AQJ 254 state is "IN PROGRESS"; the "SOQL" property to indicate the user-issued query 212 in SOQL format; the "ID" property to indicate the AQJ 254 ID (asyncQueryJobID); and the result count (ResultCount) property to indicate the number of result records that were successfully written to the destination/target object. In embodiments, the AQJ fields (targetObject and/or targetFields) may indicate the setup entities where an AQJ 254 is stored. A JSON representation of that entity's publicly visible fields may be returned in the AQJ fields, if found.

TABLE 8

Example HTTP Response message (Bad Request Error)

HTTP/1.1 404 Not Found
[other headers]
{ message:"AsyncQuery job cannot be found"}

In the example HTTP Response message of table 8, the HTTP status code 404 (Not Found) may indicate that an AQJ 254 was not found. The example HTTP Response message of table 8 also includes the "message" property to indicate the error as "AsyncQuery job cannot be found." In other examples, HTTP status code 401 (Unauthorized) may be used to indicate that the user is not authorized to invoke the async query API, HTTP status code 500 (Internal Server Error) may be used to indicate that there was a system error in invoking the async query API, and HTTP status code 400 (Bad Request) may be used to indicate that one or more request parameters 212 were not supplied (e.g., no AQJ ID was supplied and the like).

Furthermore, in various embodiments, the request 225 may be used to cancel an ongoing AQJ 254 where the request parameters 226 may include one or more of the following: an async query job ID (asyncQueryJobID), and a status message that may indicate or instruct the database system 16 (AQS 252) to cancel the AQJ 254 indicated by the async query job ID. In one example, the request message 225 to cancel an AQJ 254 may be an HTTP PUT message, where the body of the GET message may include the request parameters 226 as a JSON encoded list. Example HTTP GET and Response messages including the aforementioned parameters are shown by tables 9 and 10.

TABLE 9

Example HTTP PUT message

PUT /services/data/v32.0/asyncQuery/1QAxx0000000001 HTTP/1.1
Host: https://org62.my.salesforce.com
[other headers]
{status: "CANCEL_REQUESTED"}

TABLE 10

Example HTTP Response message (Accepted)

HTTP/1.1 200 OK
[other headers]
{
Status:"CANCEL_REQUESTED",
Id:"1QAxx0000000001",
SOQL="Select ...",
ResultCount=30056,
[other fields omitted]
}

In the example HTTP GET message of table 9, the AQJ 254 ID may be "1QAxx0000000001", and the status message may indicate that cancellation of the AQJ 254 was requested. In the example HTTP Response message of table 10, the HTTP status code 200 (OK) may indicate that an AQJ 254 was properly retrieved in response to the HTTP GET message of table 9. The example HTTP Response message of table 10 also includes the status property to indicate that the AQJ 254 state is "CANCEL_RE-QUESTED"; the "SOQL" property to indicate the user-issued query 212 in SOQL format; the "ID" property to indicate the AQJ 254 ID (asyncQueryJobID); and the result count (ResultCount) property to indicate the number of result records that were successfully written to the destination/target object. Additionally, the HTTP Response message may be the same or similar to that shown by table 8 if the request results in rejections, failures, errors, etc., including the same or similar HTTP status codes.

In addition to the embodiments discussed previously, the response messages 223, 227 may indicate error samples when job or record level errors occur. Since the user-issued query 212 may cause the database system 16 and/or cloud 300 to process millions or billions of database objects, rather than indicating each individual error per database object manipulation, the query engine 250 may sample the errors that are similar to one another based on internal hashing and/or some other mechanism, and may include a sample error in the response messages 223, 227 as response parameters 224, 228. Various procedures/processes for sampling errors may be used.

Figure 3:
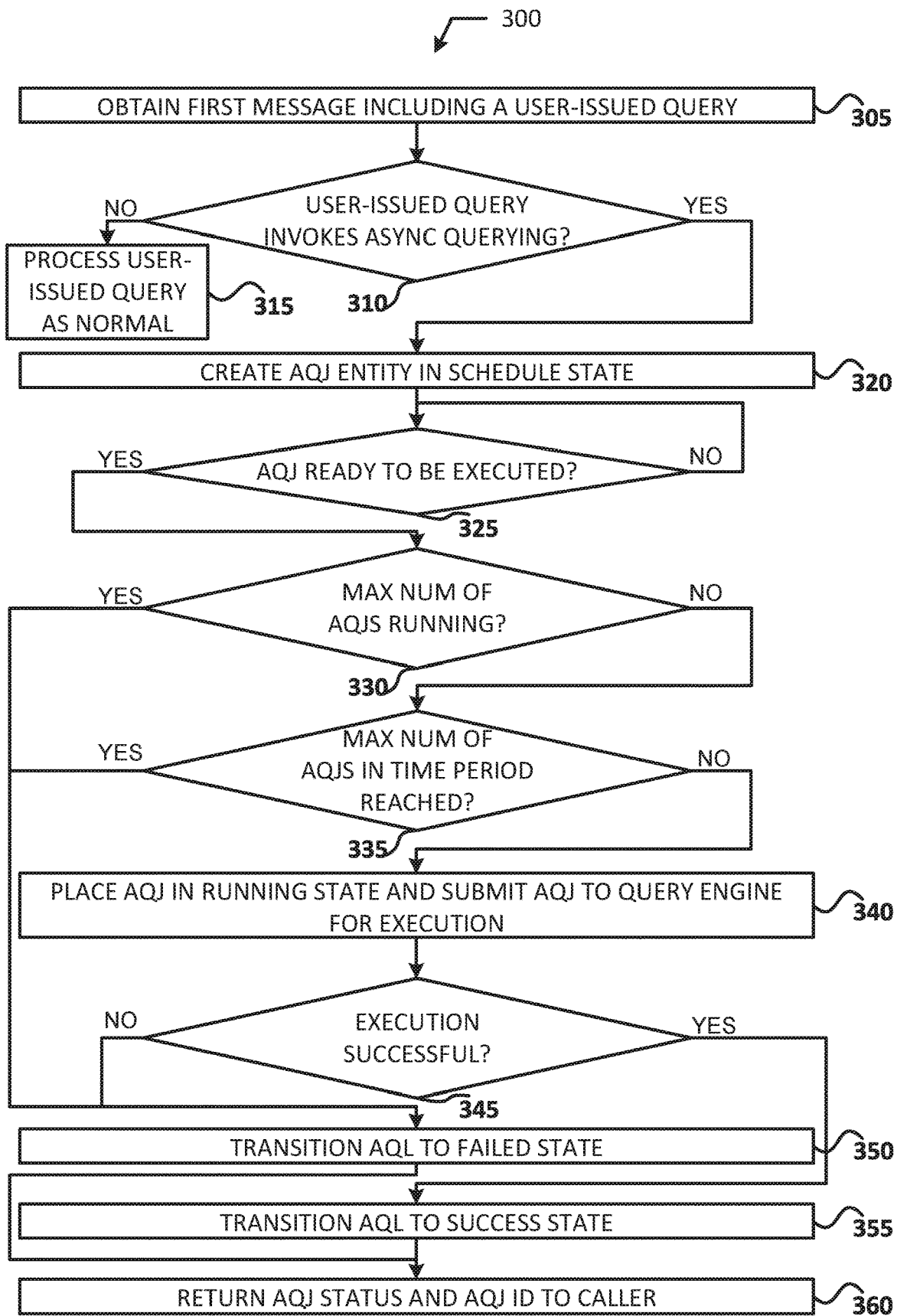
FIG. 3 illustrates a process for scheduling async query jobs, in accordance with various example embodiments.
Figure 4:
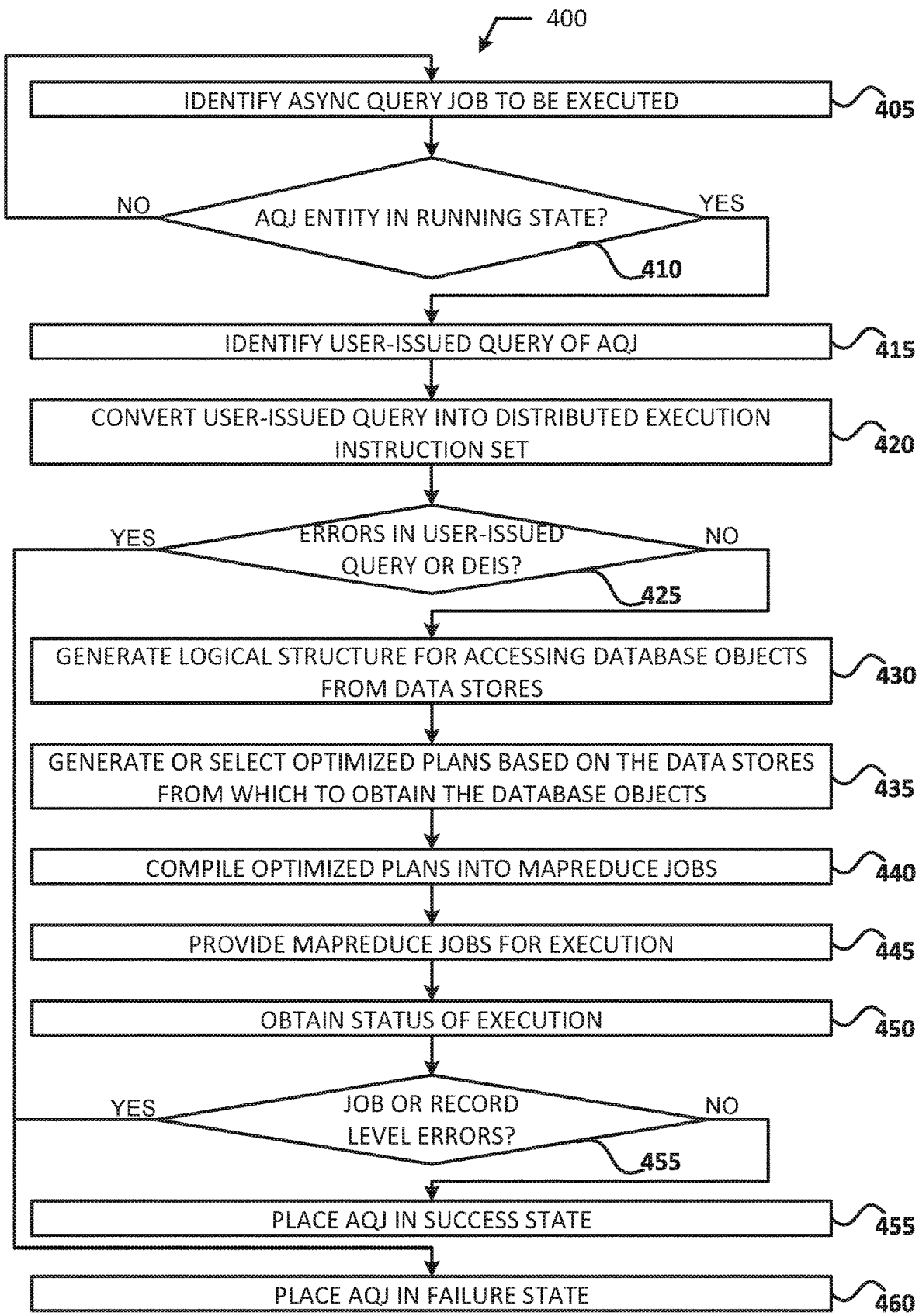
FIG. 4 illustrates a process for executing an async query that may be performed by a database system, in accordance with various example embodiments.
Figure 5:
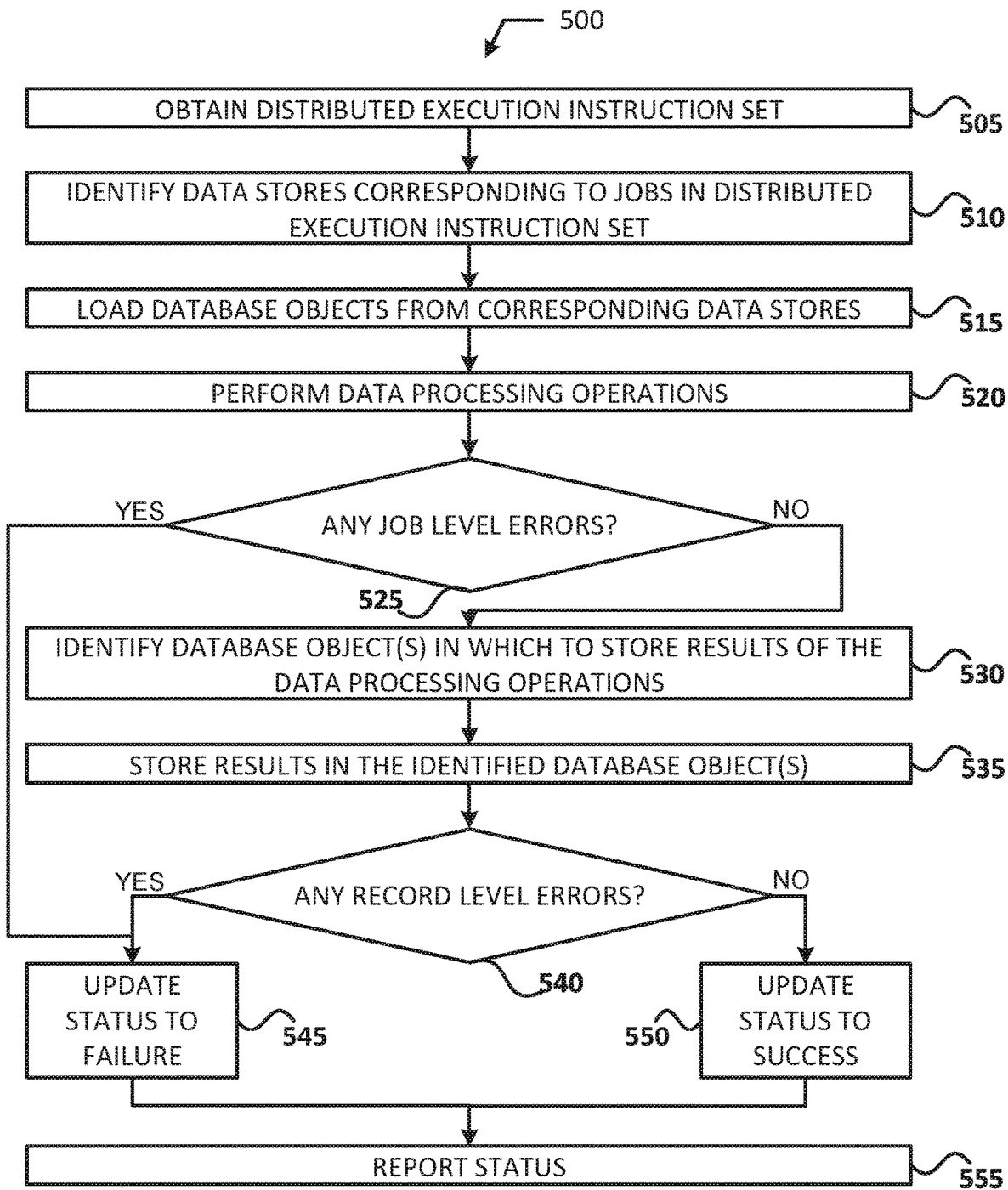
FIG. 5 illustrates a process for executing an async query that may be performed by a cloud computing service, in accordance with various example embodiments.

FIGS. 3-5 illustrates processes 300-500, respectively, in accordance with various embodiments. For illustrative purposes, the operations of processes 300-500 are described as being performed by elements/components shown and described with regard to FIGS. 1A-B and 2. However, other computing devices may operate the processes 300-500 in a multitude of implementations, arrangements, and/or environments. In embodiments, the computer system(s) may include program code stored in a memory system, which when executed by a processor system, causes the user computer system(s) to perform the various operations of processes 300-500. While particular examples and orders of operations are illustrated in FIGS. 3-5, in various embodiments, these operations may be re-ordered, separated into additional operations, combined, or omitted altogether.

FIG. 3 illustrates a process 300 for scheduling AQJs 254, in accordance with various example embodiments. In various embodiments, process 300 may be performed by the AQS 252. Although the discussion of process 300 is described as being performed by the database system 16 (or portions thereof), it should be understood that the cloud 300 may operate the AQS 252 to perform process 300 in other implementations.

Process 300 may begin at operation 305 where the database system 16 may implement the network interface 20 (or one or more app servers 100) to obtain a first message 211 including a user-issued query 212 from a user system 12. The user-issued query 212 and other request parameters 212 may be passed to the AQS 252 and/or the query engine 250 operated by the processor system 17.

At operation 310, the processor system 17 may determine whether the user-issued query 212 invokes an async querying. In embodiments, the processor system 17 may operate the query engine 250 and/or the AQS 252 to identify an async query verb in the user-issued query 212, which invokes an async query API. If the processor system 17 determines that the user-issued query 212 does not invoke the async querying, the processor system 17 may proceed to operation 315 to operate the query engine 250 to process the user-issued query 212 according to normal procedures.

If the processor system 17 determines that the user-issued query 212 does invoke the async querying, the processor system 17 may proceed to operation 320 to operate the AQS 252 to create an AQJ 524 entity in a scheduled state. In embodiments, the AQS 252 may create the AQJ 254 entity to include a plurality of fields that may include, inter alia, a status field. In such embodiments, at operation 320 the AQS 252 may insert a "scheduled" value in the status field of the created AQJ 254 entity. The scheduled value may be any type of character string, number, etc. Additionally, the plurality of fields may also include an AQJ ID field, and at operation 320 the AQS 252 may generate an AQJ ID and insert the AQJ ID in the AQJ ID field. The AQJ ID may be any time of unique identifier that may be, for example, inputting the output of a hash function that accepts the user-issued query 212 and/or other one or more request parameters 212 as an input. Other methods for generating the AQJ ID may be used. Operation 320 may include generating any of the fields shown by table 3 for the AQJ 254 entity. Furthermore, operation 320 may also include placing the AQJ 254 entity or the AQJ ID in a queue or other like schedule for execution according to known scheduling procedures.

At operation 325, the processor system 17 may determine whether the AQJ 254 is ready to be executed. In embodiments, at operation 325 the processor system 17 may determine whether the AQJ 254 entity or AQJ ID is next in the queue for execution. Other methods for determining the order/schedule for executing AQJs 254 may be used. If at operation 325 the processor system 17 determines that the AQJ 254 is not ready to be executed, the processor system 17 may loop back to determine whether the current AQJ 254 entity is ready for execution. In other embodiments, the processor system 17 may determine whether another AQJ 254 is ready for execution or may wait a predetermined period of time before looping back to perform operation 325 again.

If at operation 325 the processor system 17 determines that the AQJ 254 is ready to be executed, the processor system 17 may proceed to operation 330 to determine whether a maximum (max) number (num) of AQJs are currently running. In embodiments, the processor system 17 may operate the AQS 252 to determine whether any other currently running AQJs are associated with a user_id and/or org_id of the user system 12 that provided the user-issued query 212. This may be done by checking the value of the CreatedById field of the created AQJ 254 entity and the value of the CreatedById fields for any currently running AQJs 254. The AQS 252 may also identify a value of an AsyncQueryConcurrentRequests field of the created AQJ 254 entity to determine the maximum number of concurrent async queries that are permitted to be submitted or executed by that user_id and/or org_id.

If at operation 330 the processor system 17 determines that the max num of AQJs 254 are currently running (e.g., the number of currently executing AQJs 254 is greater than or equal to the value of the AsyncQueryConcurrentRequests field), then the processor system 17 may proceed to operation 350 to operate the AQS 252 to place the AQJ 254 in the failed state. In other embodiments, the processor system 17 may operate the AQS 252 to place the AQJ 254 entity in another location in the queue for later execution.

If at operation 330 the processor system 17 determines that the max num of AQJs 254 are not currently running (e.g., the number of currently executing AQJs 254 is less than the value of the AsyncQueryConcurrentRequests field), then the processor system 17 may proceed to operation 335 to operate the AQS 252 to determine whether the max num of AQJs 254 have been executed in a predetermined time period. The predetermined period may be a statically set time period (e.g., a set 24 hour period, a time period based on subscription information, etc.) or dynamically set according to system resources or other criteria.

In embodiments, the processor system 17 may operate the AQS 252 to determine whether any other AQJs executed in the predetermined period are associated with a user_id and/or org_id of the user system 12 that provided the user-issued query 212. This may be done by checking the value of the CreatedById field of the created AQJ 254 entity and the value of the CreatedById fields for AQJs 254 that were executed within the predetermined time period. The AQS 252 may also identify a value of an AsyncQueryTotalRequests field of the created AQJ 254 entity to determine the maximum number of async queries that are permitted to be submitted or executed by that user_id and/or org_id within the predetermined time period.

If at operation 335 the processor system 17 determines that the max num of AQJs 254 in the predetermined time period has been reached (e.g., the number of executed AQJs 254 is greater than or equal to the value of the syncQueryTotalRequests field), then the processor system 17 may proceed to operation 350 to operate the AQS 252 to place the AQJ 254 in the failed state. In other embodiments, the processor system 17 may operate the AQS 252 to place the AQJ 254 entity in another location in the queue for later execution.

If at operation 335 the processor system 17 determines that the max num of AQJs 254 in the predetermined time period has not been reached (e.g., the number of executed AQJs 254 is greater than or equal to the value of the syncQueryTotalRequests field), then the processor system 17 may proceed to operation 340 to operate the AQS 252 to place the AQJ 254 entity in the running state and submit the AQJ 254 to the query engine 250 for execution (see e.g., process 400 shown and described with regard to FIG. 4). In embodiments, operation 340 may include inserting or otherwise altering the status field to include a "running" value.

At operation 345, the processor system 17 may determine whether the execution was successful. In embodiments, after the AQJ 254 entity is placed in the running state and executed by the query engine 250 (and cloud 300), the query engine 250 and/or cloud 300 may indicate to the AQS 252 (e.g., in a message 221 from the cloud 300) whether the query was successfully executed or not. If at operation 345 the processor system 17 determines that the execution was not successful, then the processor system 17 may proceed to operation 350 to operate the AQS 252 to place the AQJ 254 in the failed state. If at operation 345 the processor system 17 determines that the execution was successful, then the processor system 17 may proceed to operation 355 to operate the AQS 252 to place the AQJ 254 in the success state.

In some embodiments, at operations 345-350, in response to the status update from the query engine 250 and/or the cloud 300, the AQS 252 may update the status field of the AQJ 254 entity to include a "success" value if the status update indicates that the query was successfully executed, or may update a ResultsFailed field and/or a ResultsDiscarded field if the status update indicates that the query was not successfully executed.

In some embodiments, the query engine 250 and/or cloud 300 may update the status field of the AQJ 254 entity to include a "success" value if the query was successfully executed, or may update a ResultsFailed field and/or a ResultsDiscarded field if the query was not successfully executed. In such embodiments, at operation 345 the processor system 17 may operate the AQS 252 to identify the value of the status field, ResultsFailed field, and/or a ResultsDiscarded field. The ResultsFailed field including a value may indicate that job level errors occurred, and/or the ResultsDiscarded field including a value may indicate that record level errors. In such embodiments, the AQS 252 may forego performing operations 350 or 355 since those fields may have already been altered by the query engine 250 and/or cloud 300.

At operation 360, the processor system 17 may return the AQJ 254 status and AQJ ID to the caller (e.g., the user system 12). In embodiments, operation 360 may include generating a response message 223 including response parameters 224 that include the values of the status field and the AQJ ID field. The response parameters 224 may include the values of other fields of the AQJ 254 entity. After operation 360, the processor system 17 may repeat process 300 as necessary or the process 300 may end.

FIG. 4 illustrates a process 400 for executing an async query, in accordance with various example embodiments. In various embodiments, process 400 may be performed by the query engine 250. Although the discussion of process 400 is described as being performed by the database system 16 (or portions thereof), it should be understood that the cloud 300 may operate the query engine 250 to perform process 400 in other implementations.

Process 400 may begin at operation 405 where the processor system 17 may implement the query engine 250 to identify an AQJ 254 to be executed. At operation 410, the processor system 17 may implement the query engine 250 to determine if the AQJ 254 is in a running state. In embodiments, operation 405 may include receiving an AQJ ID of an AQJ 254 to execute from the AQS 252, and operation 410 may include determining whether a value of a status field of the AQJ 254 entity is a "running value".

If at operation 410 the query engine 250 determines that the AQJ 254 is not in the running state, then the processor system 17 may implement the query engine 250 to loop back to operation 405 to identify another AQJ 254 to execute. If at operation 410 the query engine 250 determines that the AQJ 254 is in the running state, then the processor system 17 may implement the query engine 250 to proceed to operation 415 to identify a user-issued query 212 of the AQJ 254. In embodiments, the query engine 250 may identify the user-issued query 212 from the Query field of the AQJ 254 entity. At operation 420, the processor system 17 may implement the query engine 250 to convert the user-issued query 212 into the DEIS 214. In embodiments, the query engine 250 may convert the user-issued query 212 into a Pig Latin script.

At operation 425, the processor system 17 may implement the query engine 250 to determine whether there are any errors in the user-issued query 212 and/or the DEIS 214. If at operation 425 the query engine 250 determines that there are errors in the user-issued query 212 and/or the DEIS 214, then the processor system 17 may implement the query engine 250 to proceed to operation 460 to place the AQJ 254 in the failure state by, for example, instructing the AQS 252 to insert a "failure" value in the status field of the AQJ 254 entity. If at operation 425 the query engine 250 determines that there are no errors in the user-issued query 212 and/or the DEIS 214, then the processor system 17 may implement the query engine 250 to proceed to operation 430 to generate a logical structure for accessing database objects from various data stores 260A-C.

At operation 435, the processor system 17 may implement the query engine 250 to generate or select an optimized plan for each of the data stores 260A-C for accessing the database objects. At operation 440, the processor system 17 may implement the query engine 250 to compile the optimized plans into various MapReduce (MR) jobs. At operation 445, the processor system 17 may implement the query engine 250 to provide the various MR jobs for execution by, for example, sending the MR jobs to cloud 300 as discussed previously.

After the MR jobs are executed or sent to the cloud 300 for execution, at operation 450, the processor system 17 may implement the query engine 250 to obtain a status of the execution. At operation 455, the processor system 17 may implement the query engine 250 to determine whether the status of execution indicates any job level errors and/or record level errors. If at operation 455 the query engine 250 determines that there are no job or record level errors, then the processor system 17 may implement the query engine 250 to proceed to operation 455 to place the AQJ 254 in the success state. If at operation 455 the query engine 250 determines that there are job and/or record level errors, then the processor system 17 may implement the query engine 250 to proceed to operation 460 to place the AQJ 254 in the failure state. Operations 455 and 460 may include altering or adjusting a status field of the AQJ 254 entity or instructing the AQS 252 to alter/adjust the status field to reflect execution success or failure. After performance of operation 455 or 460, the processor system 17 may repeat process 400 as necessary, or process 400 may end.

FIG. 5 illustrates a process 500 for executing an async query, in accordance with various example embodiments. In various embodiments, process 500 may be performed by the cloud 300. Although the discussion of process 500 is described as being performed by the cloud 300 (or portions thereof), it should be understood that the database system 16 may perform process 500 in other implementations.

Process 500 may begin at operation 505 where the cloud 300 may obtain a distributed execution instruction set (DEIS) 214. In embodiments, this DEIS 214 may include a set of MR jobs that correspond to one or more data stores 260A-C. At operation 510, the cloud 300 may identify data stores 260A-C that correspond to the jobs (e.g., MR jobs) in the DEIS 214.

At operation 515, the cloud 300 may load database objects from the corresponding data stores 260A-C. In embodiments, the cloud 300 may send individual messages 215 to individual data stores 260A-C including individual executable commands 216 for retrieving the database objects, data items, etc. from the corresponding data stores 260A-C. In response, the cloud 300 may obtain individual messages 217 including corresponding database objects and/or data items 218 from the individual data stores 260A-C. At operation 520 the cloud 300 may perform various data processing operations on the loaded database objects, data items 218, etc. In embodiments, the data processing operations may include filtering operations, aggregation operations, join operations, and/or other data manipulation operations.

At operation 525, the cloud 300 may determine whether there were any job level errors in performing the data processing operations (e.g., operation 520) and/or load operations (e.g., operation 515). If at operation 525 the cloud 300 determines that there were job level errors, then the cloud 300 may proceed to operation 545 to update the job/execution status to "failure." If at operation 525 the cloud 300 determines that there were no job level errors, then the cloud 300 may proceed to operation 530 to identify one or more database objects in which to store results of the data processing operations. The one or more database objects for storing the results may be indicated in the DEIS 214 based on instructions/statements in the user-issued query 212. At operation 535, the cloud may store the results in the identified database objects (also referred to as a "target object" and the like). In embodiments, the cloud 300 may convert those data items 218a-c into a format for storage (e.g., data items 220) in one of the data stores 260A-C (e.g., data store 260A) and send those data items 220 to the data store 260 including the target objects for storing the results (e.g., data store 260A).

At operation 540, the cloud 300 may determine whether any record level errors occurred when attempting the store the results in the target objects. If at operation 540 the cloud 300 determines that record level errors did occurred during the storing procedure, then the cloud 300 may proceed to operation 545 to update the job/execution status to "failure." If at operation 540 the cloud 300 determines that record level errors did not occurred during the storing procedure, then the cloud 300 may proceed to operation 550 to update the job/execution status to "success." At operation 555, the cloud 300 may report the status to the query engine 250 and/or AQS 252. In embodiments, the cloud 300 may generate a message 221 including the status information 222 and/or any pertinent information for updating the AQJ 254, such as specific job level errors and/or record level errors that may have occurred. After performance of operation 555, process 500 may end or repeat as necessary.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer readable media (NTCRM) storing a computer program to be implemented by a database system, the computer program comprising a set of instructions, which when executed by one or more processors is to cause the database system to:
    obtain an asynchronous (async) query from a user system;
    generate an async query job (AQJ) entity in response to receipt of the async query, wherein the AQJ entity includes a plurality of AQJ fields, and the plurality of AQJ fields include a status field and a field to include an AQJ identifier (ID) of the AQJ entity;
    transition the AQJ entity to a scheduled state prior to conversion of the async query into a distributed execution instruction set (DEIS);
    alter the status field to indicate that the AQJ entity is in the scheduled state after the AQJ entity is placed in the scheduled state;
    determine whether a maximum number of AQJs in a predetermined time period have been invoked by a user that issued the async query;
    determine whether a maximum number of concurrent AQJs invoked by the user are currently running;
    transition the AQJ entity into a rejected state when the maximum number of AQJs in the predetermined time period have been invoked by the user or when the maximum number of concurrent AQJs invoked by the user are currently running;
    alter the status field to indicate that the AQJ entity is in the rejected state after the AQJ entity is placed in the rejected state;
    transition the AQJ entity to a running state to convert the async query into the DEIS;
    alter the status field to indicate that the AQJ entity is in the running state after the AQJ entity is placed in the running state; and
    in the running state,
        convert the async query into the DEIS based on one or more of a queue position, user inputs, predefined limits, resource utilization, and one or more predetermined events or triggers, wherein the conversion includes selection of respective query plans to obtain data items from one or more data stores of a plurality of data stores, and the respective query plans are unique to corresponding data stores from which the data items are to be obtained;
        issue the DEIS to a cloud computing service for execution, wherein execution of the DEIS is to cause respective instructions to be generated and issued to the one or more data stores according to a database structure of each data store of the one or more data stores and the one or more data stores including at least one data store having a database structure that is different than database structures of other data stores of the one or more data stores;
        obtain a first message including a status update, the status update indicating a status of storage of database objects from the plurality of data stores in a location specified by the async query based on the execution of the DEIS; and
        send a second message to the user system indicating the status update.

2. The one or more NTCRM of claim 1, wherein the set of instructions is to cause the database system to:
    identify an async query verb within a user-issued query, the async query verb is an instruction to treat the user-issued query as an async query; and
    convert the user-issued query into the DEIS only when the user-issued query includes the async query verb.

3. The one or more NTCRM of claim 1, wherein the set of instructions is to cause the database system to:
    determine whether the async query or the DEIS includes any syntax errors;
    transition the AQJ entity into a failed state when the async query or the DEIS includes any syntax errors; and
    alter the status field to indicate that the AQJ entity is in the failed state after the AQJ entity is placed in the failed state.

4. The one or more NTCRM of claim 1, wherein the set of instructions is to cause the database system to:
    determine whether one or more database objects were improperly stored in the location specified by the async query;
    transition the AQJ entity into a failed state when a result set was improperly stored in the location specified by the async query; and
    alter the status field to indicate that the AQJ entity is in the failed state after the AQJ entity is placed in the failed state.

5. The one or more NTCRM of claim 1, wherein the set of instructions is to cause the database system to:
    alter one or more fields of the plurality of AQJ fields based on the status indicated by the first message;
    obtain, from the user system, a request for a status of the AQJ entity, the request including the AQJ ID of the AQJ entity;
    identify a value of the status field of the AQJ entity and values of the altered one or more fields based on the AQJ ID in the request; and
    generate the second message to include the value of the status field and the values of the altered one or more fields.

6. The one or more NTCRM of claim 1, wherein the DEIS comprises a set of MapReduce (MR) jobs, and wherein, to issue the DEIS to the plurality of data stores, the set of instructions is to cause the database system to:
    issue individual MR jobs of the set of MR jobs to corresponding data stores of the plurality of data stores.

7. An application server of a database system, the application server comprising:
    a network interface to obtain a first message from a user system, wherein the first message includes an asynchronous (async) query invoking async querying; and at least one processor coupled with the network interface, wherein:

the at least one processor is to operate an async query scheduler (AQS) to:
- generate an async query job (AQJ) entity in response to invocation of the async querying, wherein the AQJ entity includes a plurality of fields, and the plurality of AQJ fields include an AQJ identifier (ID) field and a status field,
- insert the AQJ ID of the AQJ entity into an AQJ queue and into the AQJ ID field of the plurality of fields,
- transition the AQJ entity to a scheduled state prior to conversion of the async query into a distributed execution instruction set (DEIS),
- determine whether a maximum number of AQJs in a predetermined time period have been invoked by a user that issued the async query,
- determine whether a maximum number of concurrent AQJs invoked by the user are currently running;
- transition the AQJ entity into a rejected state when the maximum number of AQJs in the predetermined time period have been invoked by the user or when the maximum number of concurrent AQJs invoked by the user are currently running,
- transition the AQJ entity to a running state to convert the async query into the DEIS;
- alter the status field based on a current state of the AQJ entity including alter the status field to indicate that the AQJ entity is in the scheduled state after the AQJ entity transitions to the scheduled state, alter the status field to indicate that the AQJ entity is in the rejected state after the AQJ entity is placed in the rejected state, and alter the status field to indicate that the AQJ entity is in the running state after the AQJ entity transitions to the running state, and
- control termination, pausing, and starting of the conversion of the async query into the DEIS based on one or more of queue position, user inputs, predefined limits, system resource utilization, and one or more predefined events or triggers, wherein the conversion includes selection of respective query plans to obtain data items from one or more data stores of a plurality of data stores, and the respective query plans are unique to corresponding data stores from which the data items are to be obtained;

the at least one processor is to operate a query engine to perform the conversion of the async query into the DEIS; and the network interface is to:
- send a second message including the DEIS to a cloud computing service for execution, execution of the DEIS is to cause individual instructions of the DEIS to be issued to the plurality of data stores according to a database structure of each data store of the plurality of data stores, and
- obtain a third message indicating a status of execution of the individual instructions, the status indicating storage of obtained database objects in a location specified by the async query; and the processor system is to alter the status field or one or more other fields of the plurality of fields based on the status indicated by the third message.

8. The application server of claim 7, wherein the processor system is to operate the AQS to:
identify an async query verb within a user-issued query, wherein the async query verb is an instruction that invokes the async querying; and
convert the user-issued query into the DEIS only when the user-issued query includes the async query verb.

9. The application server of claim 7, wherein the processor system is to operate the AQS to:
insert a first value into the status field to indicate that the AQJ entity is in the scheduled state after the AQJ entity is placed in the scheduled state; and
insert a second value into the status field to indicate that the AQJ entity is in the running state after the AQJ entity is placed in the running state.

10. The application server of claim 7, wherein the processor system is to operate the AQS to:
identify job level errors during the conversion of the async query into the DEIS;
identify job level errors or record level errors from the third message; and
insert a third value into the status field to indicate that the AQJ entity is in a failed state when job level errors occur during the conversion or when the third message indicates job level errors or record level errors.

11. The application server of claim 10, wherein the processor system is to operate the AQS to:
input, into a hash function, the identified job level errors that occurred to the conversion, the job level errors from the third message, and the record level errors from the third message;
identify a sample of errors based on an output of the hash function; and
generate the third value to include the sample of errors.

12. The application server of claim 7, wherein the processor system is to operate the AQS to:
determine whether a governor limit has been met based on the invocation of the async querying; and
insert a fourth value into the status field to indicate that the AQJ entity is in the rejected state when the governor limit has been met.

13. The application server of claim 7, wherein:
the network interface is to obtain a fourth message from the user system, the fourth message indicating the AQJ ID and a request for a status of the AQJ entity, and send a fifth message to the user system; and
the processor system is to generate the fifth message to include a value of the status field and values of the one or more other fields in response to receipt of the fourth message.

14. The application server of claim 13, wherein:
the network interface is to obtain a sixth message from the user system, the sixth message indicating the AQJ ID and a request to terminate the AQJ entity, and
the processor system is to terminate the AQJ entity, insert a fifth value into the status field to indicate that the AQJ entity has been terminated, and generate the fourth message in response to receipt of the sixth message.

15. A method of operating a database system, comprising:
obtaining an asynchronous (async) query from a user system;
generating an async query job (AQJ) entity in response to receipt of the async query, wherein the AQJ entity includes a plurality of AQJ fields, and the plurality of AQJ fields include a status field and a field to include an AQJ identifier (ID) of the AQJ entity;
transitioning the AQJ entity to a scheduled state prior to conversion of the async query into a distributed execution instruction set (DEIS);
altering the status field to indicate that the AQJ entity is in the scheduled state after the AQJ entity is placed in the scheduled state;

determining whether a maximum number of AQJs in a predetermined time period have been invoked by a user that issued the async query;

determining whether a maximum number of concurrent AQJs invoked by the user are currently running;

transitioning the AQJ entity into a rejected state when the maximum number of AQJs in the predetermined time period have been invoked by the user or when the maximum number of concurrent AQJs invoked by the user are currently running;

altering the status field to indicate that the AQJ entity is in the rejected state after the AQJ entity is placed in the rejected state;

transitioning the AQJ entity to a running state to convert the async query into the DEIS;

altering the status field to indicate that the AQJ entity is in the running state after the AQJ entity is placed in the running state; and in the running state, converting the async query into the DEIS based on one or more of a queue position, user inputs, predefined limits, resource utilization, and one or more predetermined events or triggers, wherein the conversion includes selection of respective query plans to obtain data items from one or more data stores of a plurality of data stores, and the respective query plans are unique to corresponding data stores from which the data items are to be obtained;

issuing the DEIS to a cloud computing service for execution, wherein execution of the DEIS is to cause respective instructions to be generated and issued to the one or more data stores according to a database structure of each data store of the one or more data stores and the one or more data stores including at least one data store having a database structure that is different than database structures of other data stores of the one or more data stores;

obtaining a first message including a status update, the status update indicating a status of storage of database objects from the plurality of data stores in a location specified by the async query based on the execution of the DEIS; and sending a second message to the user system indicating the status update.

16. The method of claim 15, wherein the method comprises:

identifying an async query verb within a user-issued query, the async query verb is an instruction to treat the user-issued query as an async query; and converting the user-issued query into the DEIS only when the user-issued query includes the async query verb.

17. The method of claim 15, wherein the method comprises:

determining whether the async query or the DEIS includes any syntax errors;

transitioning the AQJ entity into a failed state when the async query or the DEIS includes any syntax errors; and altering the status field to indicate that the AQJ entity is in the failed state after the AQJ entity is placed in the failed state.

18. The method of claim 15, wherein the method comprises:

determining whether one or more database objects were improperly stored in the location specified by the async query;

transitioning the AQJ entity into a failed state when a result set was improperly stored in the location specified by the async query; and altering the status field to indicate that the AQJ entity is in the failed state after the AQJ entity is placed in the failed state.

19. The method of claim 15, wherein the method comprises:

altering one or more fields of the plurality of AQJ fields based on the status indicated by the first message;

obtaining, from the user system, a request for a status of the AQJ entity, the request including the AQJ ID of the AQJ entity;

identifying a value of the status field of the AQJ entity and values of the altered one or more fields based on the AQJ ID in the request; and generating the second message to include the value of the status field and the values of the altered one or more fields.

20. The method of claim 15, wherein the DEIS comprises a set of MapReduce (MR) jobs, and issuing the DEIS to the plurality of data stores comprises:

issuing individual MR jobs of the set of MR jobs to corresponding data stores of the plurality of data stores.

* * * * *